(12) United States Patent
Kirihara et al.

(10) Patent No.: US 12,352,637 B2
(45) Date of Patent: Jul. 8, 2025

(54) HEAT-FLOW SENSOR

(71) Applicant: NEC Corporation, Tokyo (JP)

(72) Inventors: Akihiro Kirihara, Tokyo (JP); Masahiko Ishida, Tokyo (JP); Yuma Iwasaki, Tokyo (JP); Yasutomo Omori, Tokyo (JP); Hiroko Someya, Tokyo (JP); Sadanori Hattori, Tokyo (JP)

(73) Assignee: NEC CORPORATION, Tokyo (JP)

( * ) Notice: Subject to any disclaimer, the term of this patent is extended or adjusted under 35 U.S.C. 154(b) by 743 days.

(21) Appl. No.: 17/641,897

(22) PCT Filed: Sep. 25, 2019

(86) PCT No.: PCT/JP2019/037557
§ 371 (c)(1),
(2) Date: Mar. 10, 2022

(87) PCT Pub. No.: WO2021/059391
PCT Pub. Date: Apr. 1, 2021

(65) Prior Publication Data
US 2022/0326094 A1    Oct. 13, 2022

(51) Int. Cl.
*G01K 7/36* (2006.01)
*G01K 17/06* (2006.01)

(52) U.S. Cl.
CPC .............. *G01K 7/36* (2013.01); *G01K 17/06* (2013.01)

(58) Field of Classification Search
None
See application file for complete search history.

(56) References Cited

U.S. PATENT DOCUMENTS

| | | | |
|---|---|---|---|
| 2018/0033940 A1* | 2/2018 | Kirihara | ............... H10N 10/855 |
| 2020/0212282 A1 | 7/2020 | Nakatsuji et al. | |

FOREIGN PATENT DOCUMENTS

| | | |
|---|---|---|
| JP | 2000-067416 A | 3/2000 |
| JP | 6079995 B | 2/2017 |
| JP | 2019-090756 A | 6/2019 |
| WO | 2019/009308 A1 | 1/2019 |

OTHER PUBLICATIONS

International Search Report for PCT Application No. PCT/JP2019/037557, mailed on Dec. 17, 2019.
English translation of Written opinion for PCT Application No. PCT/JP2019/037557, mailed on Dec. 17, 2019.

* cited by examiner

*Primary Examiner* — Erica S Lin
(74) *Attorney, Agent, or Firm* — Sughrue Mion, PLLC

(57) ABSTRACT

A heat-flow sensor that includes an insulating layer, a magnetic field application layer arranged on a first surface of the insulating layer and composed of a conductor, and a heat-flow detection layer arranged on a second surface of the insulating layer, the second surface facing the first surface, and the heat-flow detection layer composed of a conductive magnetic body. The heat-flow detection layer faces the magnetic field application layer via the insulating layer.

11 Claims, 23 Drawing Sheets

HEAT-FLOW SENSOR

This application is a National Stage Entry of PCT/JP2019/037557 filed on Sep. 25, 2019, the contents of all of which are incorporated herein by reference, in their entirety.

TECHNICAL FIELD

The present invention relates to a heat-flow sensor using an anomalous Nernst effect.

BACKGROUND ART

A heat-flow sensor is a sensor that measures the amount of heat (hereinafter referred to as heat flow) passing through a unit cross-sectional area per unit time. The heat flow is generated in a non-equilibrium state in which the temperature balance is broken, and includes information such as a direction and an amount of propagation. Since the heat flow responds faster than the temperature, if the heat flow can be accurately measured, information of the heat can be obtained earlier than measurement of the temperature.

PTL 1 discloses a heat flux sensor using the Seebeck effect. The heat flux sensor of PTL 1 has a structure in which a first thermoelectric member made of a P-type semiconductor material and a second thermoelectric material made of an N-type semiconductor material are alternately connected by a conductor pattern.

PTL 2 discloses a thermoelectric power generation device using the anomalous Nernst effect. The thermoelectric power generation device of PTL 2 includes a power generator including a plurality of thin wires magnetized in the same direction, electrically connected in series, and arranged in parallel to each other. The power generator of PTL 2 generates power with a temperature difference in a direction perpendicular to the magnetization direction due to the anomalous Nernst effect.

CITATION LIST

Patent Literature

[PTL 1] JP 2019-090756 A
[PTL 2] JP 6079995 B

SUMMARY OF INVENTION

Technical Problem

Since the heat flux sensor of PTL 1 is a Seebeck thermoelectric element, an alternating connection structure (vertical thermopile structure) of a P-type semiconductor and an N-type semiconductor has been required to increase an extraction voltage. Therefore, the heat flux sensor of PTL 1 has the structure in which the first thermoelectric member made of a P-type semiconductor material and the second thermoelectric member made of an N-type semiconductor material are alternately connected by the conductor pattern and includes many connection points, and thus has a problem that the structure is complicated and fragile. Further, the heat flux sensor of PTL 1 can have high sensitivity by increasing the thickness in the perpendicular direction but has large thermal resistance in the perpendicular direction by increasing the thickness in the perpendicular direction, and has a problem that the heat flow flowing in the perpendicular direction is hindered.

Since an electromotive force generated in an in-plane direction by the heat flow flowing in the perpendicular direction can be detected by using the power generator of PTL 2, a thinner heat-flow sensor than a heat-flow sensor using the Seebeck effect can be implemented. In addition, a stably magnetized ferromagnetic metal material has needed to be applied to the power generator of PTL 2. In the case of a material with unstable magnetization, the magnetization state is easily changed by an environmental magnetic field from the outside, and a problem that a sensing function is impaired or becomes unstable arises. Further, to increase the electromotive force and sensitivity of the heat-flow sensor using the power generator of PTL 2, it has been necessary to form a structure (horizontal thermopile structure) in which metal materials of two types of ferromagnets having different signs and magnitudes of the anomalous Nernst effect are alternately connected.

An object of the present invention is to solve the above-described problems and to provide a highly sensitive thin-film heat-flow sensor that detects heat flow with a single conductive magnetic body.

Solution to Problem

A heat-flow sensor according to one aspect of the present invention includes an insulating layer; a magnetic field application layer arranged on a first surface of the insulating layer and including a conductor; and a heat-flow detection layer arranged on a second surface of the insulating layer, the second surface facing the first surface, and the heat-flow detection layer including a conductive magnetic body. The heat-flow detection layer faces the magnetic field application layer via the insulating layer.

A heat-flow sensor according to an aspect of the present invention includes a substrate; a first magnetic field application layer arranged on an upper surface of the substrate and including a conductor; a first insulating layer arranged on an upper surface of the first magnetic field application layer; a heat-flow detection layer arranged on an upper surface of the first insulating layer and including a conductive magnetic body; a second insulating layer arranged on an upper surface of the heat-flow detection layer; and a second magnetic field application layer arranged on an upper surface of the second insulating layer and including a conductor. The heat-flow detection layer faces the first magnetic field application layer via the first insulating layer, and faces the second magnetic field application layer via the second insulating layer.

Advantageous Effects of Invention

According to the present invention, it is possible to provide a highly sensitive thin-film heat-flow sensor that detects heat flow with a single conductive magnetic body.

EXAMPLE EMBODIMENT

Figure 1:
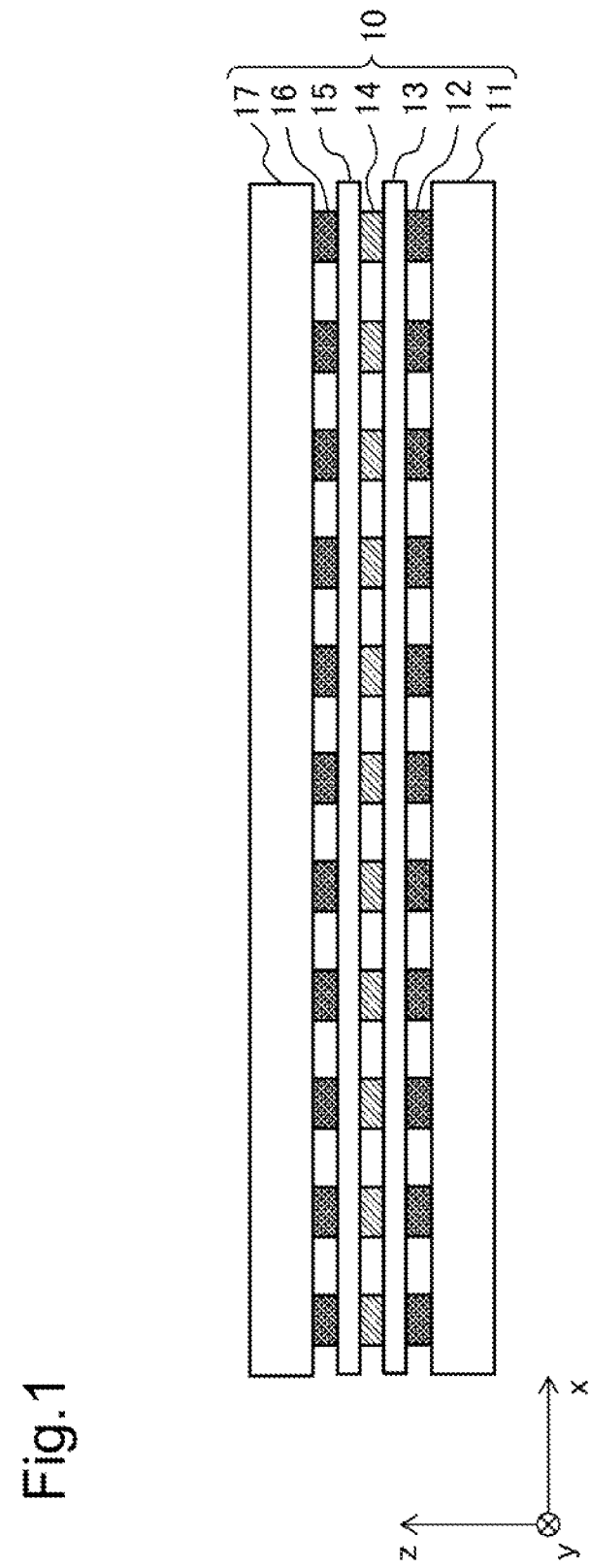
FIG. 1 is a conceptual diagram illustrating an example of a structure of a heat-flow sensor according to a first example embodiment.

Hereinafter, forms for implementing the present invention will be described with reference to the drawings. The example embodiments to be described below have technically favorable limitations for implementing the present invention. However, the scope of the invention is not limited to below. In all the drawings used in the following description of the example embodiments, the same reference numerals are given to similar parts unless there is a particular reason. In the following example embodiments, repeated description of similar configurations and operations may be omitted. The directions of the arrows in the drawings are illustrative and do not limit the directions of signals between blocks. In the following example embodiments, an actually measured value of heat flow is referred to as a heat-flow value.

First Example Embodiment

First, a heat-flow measurement system according to a first example embodiment will be described with reference to the drawings. The heat-flow measurement system of the present example embodiment is provided with a heat-flow sensor including a heat-flow detection layer including a magnetic material exhibiting the anomalous Nernst effect. Hereinafter, the heat-flow sensor will be described, and then the heat-flow measurement system including the heat-flow sensor will be described.

[Heat-Flow Sensor]

FIG. 1 is a conceptual diagram illustrating an example of a configuration of a heat-flow sensor 10 included in a heat-flow measurement system of the present example embodiment. The heat-flow sensor 10 has a flat plate-like appearance. FIG. 1 is a side view of the flat plate-like heat-flow sensor 10 as viewed from a side.

The heat-flow sensor 10 includes a substrate 11, a first magnetic field application layer 12, a first insulating layer 13, a heat-flow detection layer 14, a second insulating layer 15, a second magnetic field application layer 16, and a cover layer 17.

The substrate 11 is a base material having an upper surface on which the first magnetic field application layer 12 is formed. The substrate 11 is made of a material that easily conducts heat flow. For example, the substrate 11 is made of polyimide. Note that the material of the substrate 11 is not limited to polyimide as long as heat flow is easily conducted.

The first magnetic field application layer 12 is formed on the upper surface of the substrate 11. The first magnetic field application layer 12 is a conductor formed in a predetermined pattern having a first end and a second end. For example, the first magnetic field application layer 12 has a meander shape in which the first end and the second end are arranged at positions separated from each other in top view. The meander shape is a shape in which ends of adjacent wires are connected so that a plurality of wires provided in parallel is connected in series to form one line as a whole. In the case where the first magnetic field application layer 12 has the meander shape, a wire having the first end and the second end is arranged so as to be folded back on the surface of the substrate 11. The shape of the first magnetic field application layer 12 is not limited to the meander shape as long as the line length of the wire from the first end to the second end can be made long.

For example, the first magnetic field application layer 12 is made of a metal material such as copper (Cu), aluminum (Al), or gold (Au). The material of the first magnetic field application layer 12 is not limited to the metal material such as Cu, Al, or Au as long as the material has conductivity. For example, the first magnetic field application layer 12 can be formed by a sputtering method or a plating method. The first magnetic field application layer 12 may be formed by a method other than the sputtering method or the plating method.

The first insulating layer 13 is an insulator arranged between the first magnetic field application layer 12 and the heat-flow detection layer 14. As an example, a surface on which the first magnetic field application layer 12 is arranged is referred to as a first surface, and a surface on which the heat-flow detection layer 14 is arranged is referred to as a second surface, of two main surfaces of the first insulating layer 13. For example, the first insulating layer 13 is made of polyimide. The material of the first insulating layer 13 is not limited to polyimide as long as the material has insulating properties.

The heat-flow detection layer 14 is arranged between the first insulating layer 13 and the second insulating layer 15. The heat-flow detection layer 14 is a conductive magnetic body formed in a predetermined pattern having a first end and a second end. For example, the patterns of the conductors constituting the first magnetic field application layer 12 and the second magnetic field application layer 16 and the pattern of the conductive magnetic body constituting the heat-flow detection layer 14 face each other. For example, the patterns of the conductors constituting the first magnetic field application layer 12 and the second magnetic field application layer 16 and the pattern of the conductive magnetic body included in the heat-flow detection layer 14 have the same shape. For example, each of the first magnetic field application layer 12 and the second magnetic field application layer 16, and the heat-flow detection layer 14 are arranged such that a line of one pattern extends along the line length of another pattern in top view.

The wire pattern of the conductor constituting the heat-flow detection layer 14 and the wire patterns of the conductors constituting the first magnetic field application layer 12 and the second magnetic field application layer 16 may not have exactly the same wire width. In a case where the wire width of the wire pattern of the conductor constituting the heat-flow detection layer 14 is wider, there is a possibility that the intensity of magnetization becomes non-uniform and an uneven electromotive force distribution occurs in the wire of one line of heat-flow detection layer 14, and the output signal becomes small, if there is an influence of misalignment or the like. Therefore, it is desirable that the wire widths of the wire patterns of the conductors constituting the first magnetic field application layer 12 and the second magnetic field application layer 16, and the heat-flow detection layer 14 are substantially the same, or the wire widths of the first magnetic field application layer 12 and the second magnetic field application layer 16 are wider. In addition, if the wire width of the wire pattern of the conductor constituting heat-flow detection layer 14 is too narrow, the internal resistance becomes large and noise increases. Therefore, the wire width of the wire pattern of the conductor constituting the heat-flow detection layer 14 is favorably half of or in a similar range of the wire widths of the first magnetic field application layer 12 and the second magnetic field application layer 16.

In addition, the wire pattern of the conductor constituting the heat-flow detection layer 14, and the wire patterns of the conductors constituting the first magnetic field application layer 12 and the second magnetic field application layer 16 may slightly deviate from each other in top view. An allowable deviation is favorably equal to or less than a gap width between the wires of the wire pattern of the conductor constituting heat-flow detection layer 14. In addition, in a case where an insulating layer that fills the gaps between the wires of the wire pattern of the conductor constituting the heat-flow detection layer 14 is provided, the allowable deviation is favorably equal to or less than the width of the insulating layer. In addition, when alignment accuracy of a process of manufacturing the heat-flow detection layer 14, the first magnetic field application layer 12, and the second magnetic field application layer 16 is dx, it is desirable that the gap width (insulating layer width) between the wires of the wire pattern of the conductor constituting the heat-flow detection layer 14 is equal to or more than dx (dx is a positive real number).

If the distance between the heat-flow detection layer 14 and the first magnetic field application layer 12 is equal to the distance between the heat-flow detection layer 14 and the second magnetic field application layer 16, the heat flow generated in the perpendicular direction (z direction) can be canceled by currents flowing through the first magnetic field application layer 12 and the second magnetic field application layer 16. Therefore, the distance between the heat-flow detection layer 14 and the first magnetic field application layer 12 is favorably equal to the distance between the heat-flow detection layer 14 and the second magnetic field application layer 16.

For the heat-flow detection layer 14, it is favorable to use a soft magnetic thin film so as to be easily magnetized in the in-plane direction (direction in an xy plane) of the heat-flow sensor 10 by a magnetic field generated by the currents flowing through the first magnetic field application layer 12 and the second magnetic field application layer 16. For example, a soft magnetic material containing a metal such as iron (Fe), aluminum (Al), or nickel (Ni) can be used for the heat-flow detection layer 14. Specifically, as the material of the heat-flow detection layer 14, an iron-aluminum alloy such as $Fe_3Al$, a permalloy such as $Ni_{80}Fe_{20}$, or a metal such as Ni can be used. For example, the heat-flow detection layer 14 of $Fe_3Al$ can be formed by a sputtering method using a photoresist pattern or a metal mask formed by a photolithography method. Further, for example, the heat-flow detection layer 14 of Ni can be formed by a plating method.

The heat-flow detection layer 14 favorably has a shape having a long effective length in order to enhance the sensing sensitivity. For example, the heat-flow detection layer 14 has a meander shape in which the first end and the second end are arranged at positions separated from each other in top view, similarly to the first magnetic field application layer 12. In the case where the heat-flow detection layer 14 has a meander shape, the magnetic wire having the first end and the second end is arranged so as to be folded back on the surface of the first insulating layer 13. In the case where the heat-flow detection layer 14 is implemented by a meander-shaped magnetic wire, there is a possibility that the wires interfere with each other to weaken the magnetic field if the distance between adjacent wires is too short. Therefore, it is favorable to arrange the wires with a certain distance. The shape of the heat-flow detection layer 14 is not limited to the meander shape as long as the line length of the wire from the first end to the second end can be made long.

The thinner the heat-flow detection layer 14 is, the more easily the shape-magnetic anisotropy is generated, and thus the heat-flow detection layer 14 is easily magnetized in the in-plane direction. However, if the heat-flow detection layer 14 is too thin, the electric resistance becomes large and noise increases, and thus it is favorable to have the thickness in consideration of the required magnetization and balance. In addition, an insulating buffer layer may be provided between a plurality of wires constituting the heat-flow detection layer 14.

The second insulating layer 15 is an insulator arranged between the heat-flow detection layer 14 and the second magnetic field application layer 16. As an example, a surface on which the second magnetic field application layer 16 is arranged is referred to as a first surface, and a surface on which the heat-flow detection layer 14 is arranged is referred to as a second surface, of two main surfaces of the second insulating layer 15. The second insulating layer 15 favorably has the same thickness as the first insulating layer 13. For example, the second insulating layer 15 is made of polyimide. The material of the second insulating layer 15 is not limited to polyimide as long as the material has insulating properties.

The second magnetic field application layer 16 is formed on the upper surface of the second insulating layer 15. The second magnetic field application layer 16 is a conductor formed in a predetermined pattern having a first end and a second end. For example, the second magnetic field application layer 16 is formed in a similar pattern to the first magnetic field application layer 12. For example, the second magnetic field application layer 16 and the first magnetic field application layer 12 overlap each other in top view. For example, the second magnetic field application layer 16 has a meander shape in which the first end and the second end are arranged at positions separated from each other in top view. In the case where the second magnetic field application layer 16 has the meander shape, the wire having the first end and the second end is arranged so as to be folded back on the surface of the second insulating layer 15. The shape of the second magnetic field application layer 16 is not limited to the meander shape as long as the line length of the wire from the first end to the second end can be made long.

For example, the second magnetic field application layer 16 is made of a metal material such as copper, aluminum, or gold. Note that the material of the second magnetic field application layer 16 is not limited to the metal material such as copper, aluminum, or gold as long as the material is conductive. For example, the second magnetic field application layer 16 can be formed by plating. The second magnetic field application layer 16 may be formed by a method other than plating.

The cover layer 17 is formed on the upper surface of the second magnetic field application layer 16. The cover layer 17 is a protective layer that protects the heat-flow sensor 10. The cover layer 17 is favorably made of an insulating material having high mechanical strength, chemical stability, heat resistance, and the like. For example, the cover layer 17 is made of polyimide. The material of the cover layer 17 is not limited to polyimide as long as the material has sufficient mechanical strength, chemical stability, heat resistance, and the like.

The range in which the heat-flow sensor 10 detects the heat flow is within the range of the pattern of the heat-flow detection layer 14. In other words, the heat-flow sensor 10 detects the heat flow within the range of the pattern of the heat-flow detection layer 14 to which the magnetic field is applied by the first magnetic field application layer 12 and the second magnetic field application layer 16. When the heat-flow sensor 10 is used, the first end of the first magnetic field application layer 12 and the second end of the second magnetic field application layer 16, or the second end of the first magnetic field application layer 12 and the first end of the second magnetic field application layer 16 are electrically connected by a conductive wire (not illustrated). Then, it is configured such that, when a direct current is applied to the first magnetic field application layer 12 and the second magnetic field application layer 16, the currents flow in opposite directions at facing positions of the first magnetic field application layer 12 and the second magnetic field application layer 16.

A magnetic field is generated at a position of the heat-flow detection layer 14 sandwiched between the first magnetic field application layer 12 and the second magnetic field application layer 16 due to the current flowing through the first magnetic field application layer 12 and the current flowing through the second magnetic field application layer 16. At the position of the heat-flow detection layer 14, the magnetic field applied by the current flowing through the first magnetic field application layer 12 and the magnetic field applied by the current flowing through the second magnetic field application layer 16 are added. The heat-flow detection layer 14 is magnetized in the in-plane direction (in-xy-plane direction) of the heat-flow sensor 10 by the magnetic field applied by the first magnetic field application layer 12 and the second magnetic field application layer 16. As the first magnetic field application layer 12 and the second magnetic field application layer 16 are thicker than the heat-flow detection layer 14, the variation in the magnetic field applied to the heat-flow detection layer 14 is reduced. Therefore, the first magnetic field application layer 12 and the second magnetic field application layer 16 are favorably thicker in the film thickness than the heat-flow detection layer 14.

The currents flowing through the first magnetic field application layer 12 and the second magnetic field application layer 16 are favorably equal to each other. If the currents flowing through the first magnetic field application layer 12 and the second magnetic field application layer 16 are equal, the heat flows caused by the Joule heat generated by the currents flowing through the respective magnetic field application layers are canceled. As a result, a thermal gradient in the perpendicular direction perpendicular (in-zy-plane direction) caused by the Joule heat of the currents flowing through the first magnetic field application layer 12 and the second magnetic field application layer 16 is eliminated, so that the detection sensitivity of the heat flow from the outside is improved.

A voltage value V related to an electromotive force generated in the heat-flow detection layer 14 can be expressed by the following equation 1, using an electric field E generated in the in-plane direction of the heat-flow detection layer 14 by the anomalous Nernst effect and a line length L of the wire from a first end 141 to a second end 142 of the heat-flow detection layer 14.

$$V=EL \quad (1)$$

The electric field E based on the anomalous Nernst effect can be expressed by the following equation 2, using an anomalous Nernst coefficient Q and magnetic permeability μ of the heat-flow detection layer 14, a temperature gradient dT between the upper surface and the lower surface of the heat-flow detection layer 14, and magnetization M of the heat-flow detection layer 14.

$$E=Q(\mu M \times dT) \quad (2)$$

Further, the temperature gradient dT can be expressed by the following equation 3, using thermal conductivity λ of the heat-flow detection layer 14 and a heat-flow value q passing through the heat-flow detection layer 14.

$$dT=-q/\lambda, \quad (3)$$

By using the above equations 1 to 3, the heat-flow value q related to the voltage value can be calculated using the voltage value V related to the electromotive force generated in the heat-flow detection layer 14.

The configuration of the heat-flow sensor 10 included in the heat-flow measurement system of the present example embodiment has been described. Note that the configuration of FIG. 1 is an example of the configuration of the heat-flow sensor 10, and the configuration of the heat-flow sensor 10 included in the heat-flow measurement system of the present example embodiment is not limited to the configuration of FIG. 1.

[Heat-Flow Measurement System]

Next, the heat-flow measurement system according to the present example embodiment will be described with reference to the drawings. The heat-flow measurement system of the present example embodiment includes a direct-current power supply for causing the current to flow through the first magnetic field application layer 12 and the second magnetic field application layer 16 of the heat-flow sensor 10.

Figure 2:
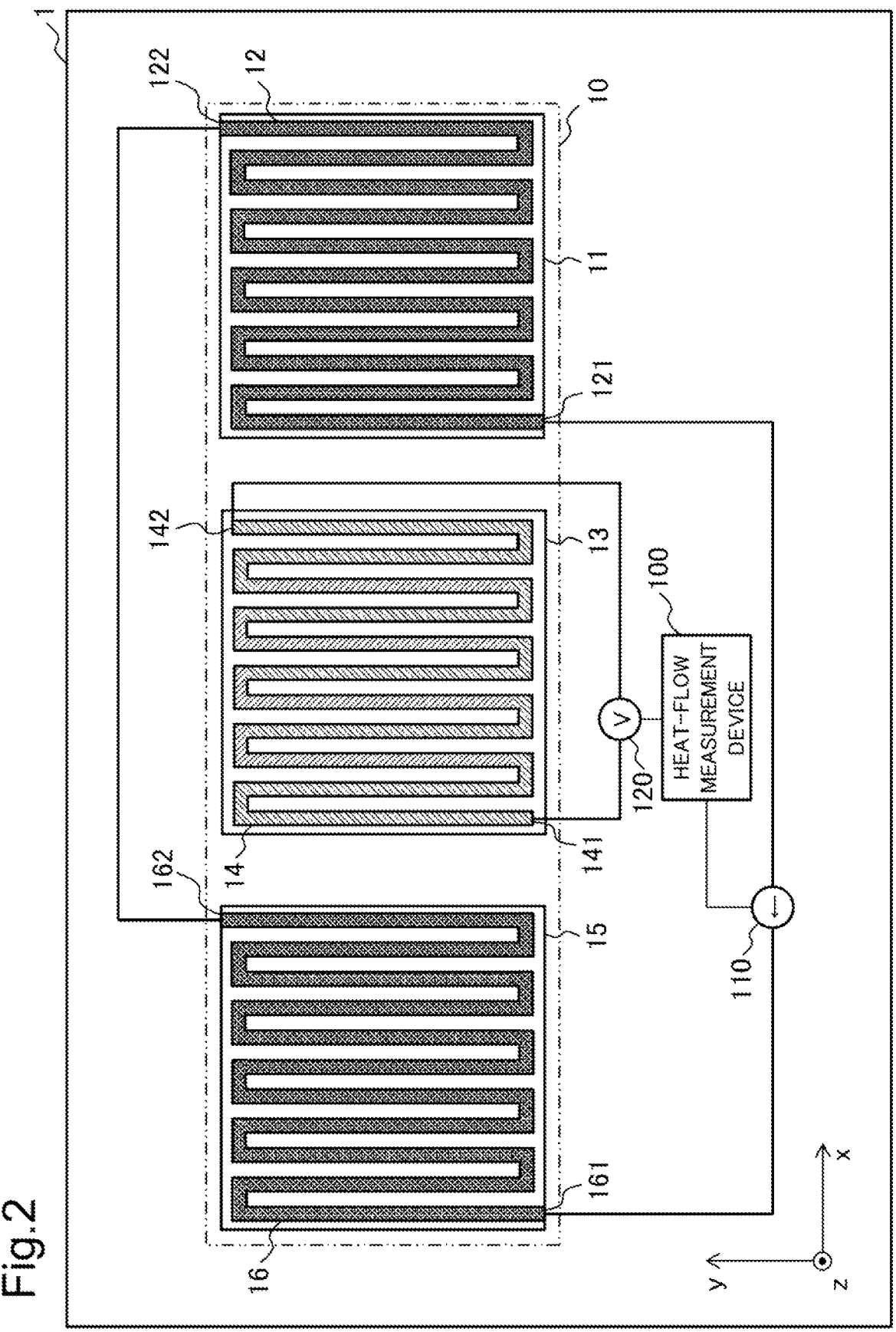
FIG. 2 is a conceptual diagram for describing a configuration of a heat-flow measurement system according to the first example embodiment.

FIG. 2 is a conceptual diagram illustrating an example of a configuration of the heat-flow measurement system 1 of the present example embodiment. As illustrated in FIG. 2, the heat-flow measurement system 1 includes the heat-flow sensor 10, a heat-flow measurement device 100, a direct-current power supply 110, and a voltmeter 120. In FIG. 2, the first magnetic field application layer 12, the heat-flow detection layer 14, and the second magnetic field application layer 16, which are stacked in practice, are virtually arranged side by side.

The heat-flow sensor 10 has the structure illustrated in FIG. 1. The heat-flow sensor 10 includes, as illustrated in FIG. 1, the substrate 11, the first magnetic field application layer 12, the first insulating layer 13, the heat-flow detection layer 14, the second insulating layer 15, the second magnetic field application layer 16, and the cover layer 17. In practice, the first magnetic field application layer 12, the heat-flow detection layer 14, and the second magnetic field application layer 16 are stacked In FIG. 2, the cover layer 17 is omitted.

The first magnetic field application layer 12 has a first end 121 and a second end 122. The heat-flow detection layer 14 has a first end 141 and a second end 142. The second magnetic field application layer 16 has a first end 161 and a second end 162.

The second end 122 of the first magnetic field application layer 12 is electrically connected to the second end 162 of the second magnetic field application layer 16. For example, an insulator is filled among the second end 162 of the heat-flow detection layer 14, a side surface of the heat-flow sensor 10, the first insulating layer 13, and the second insulating layer 15. Then, a wire (not illustrated) is arranged on the side surfaces of the first insulating layer 13 and the second insulating layer 15 and the side surface of the heat-flow sensor 10 formed of the filled insulator, so that the second end 122 of the first magnetic field application layer 12 and the second end 162 of the second magnetic field application layer 16 can be electrically connected. Further, for example, by providing a via electrode that penetrates the insulator filled among the second end 162 of the heat-flow detection layer 14, the side surface of the heat-flow sensor 10, the first insulating layer 13, and the second insulating layer 15, and the first insulating layer 13 and the second insulating layer 15, the second end 122 of the first magnetic field application layer 12 and the second end 162 of the second magnetic field application layer 16 can be electrically connected. The via electrode is provided so as not to be in contact with the heat-flow detection layer 14.

The first end 121 of the first magnetic field application layer 12 is electrically connected to the first end 161 of the second magnetic field application layer 16 across the direct-current power supply 110. The first end 141 of the heat-flow sensor 10 is electrically connected to the second end 142 of the heat-flow sensor 10. The voltmeter 120 is arranged between the first end 141 and the second end 142 of the heat-flow sensor 10.

The heat-flow measurement device 100 is connected to direct-current power supply 110 and voltmeter 120. The heat-flow measurement device 100 drives the direct-current power supply 110 to control the current flowing through the first magnetic field application layer 12 and the second magnetic field application layer 16. In addition, the heat-flow measurement device 100 measures the electromotive force generated in the heat-flow detection layer 14 by passage of the heat flow, using the voltmeter 120.

The direct-current power supply 110 outputs a direct current according to the control of the heat-flow measurement device 100. The direct-current power supply 110 has a positive electrode connected to the first end 161 of the second magnetic field application layer 16, and a negative electrode connected to the first end 121 of the first magnetic field application layer 12. In the case where the directions of the currents flowing through the first magnetic field application layer 12 and the second magnetic field application layer 16 are configured to be opposite, the direct-current power supply 110 has the negative electrode connected to the first end 161 of the second magnetic field application layer 16, and the positive electrode connected to the first end 121 of the first magnetic field application layer 12.

The voltmeter 120 is a direct-current voltmeter connected to the first end 141 and the second end 142 of the heat-flow detection layer 14. The voltmeter 120 measures the voltage between the first end 141 and the second end 142 of the heat-flow detection layer 14, and outputs a measured voltage value to the heat-flow measurement device 100.

Figure 3:
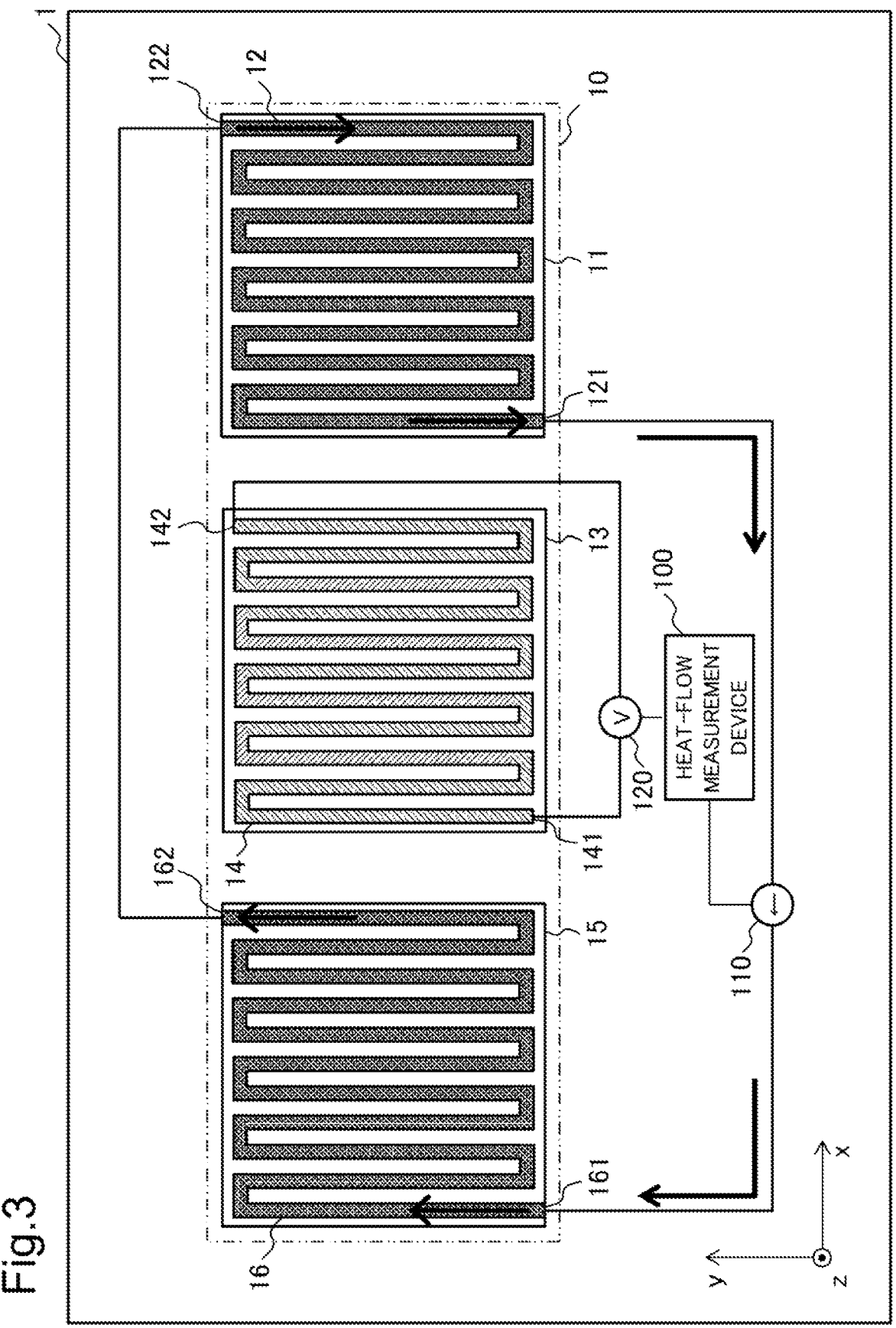
FIG. 3 is a conceptual diagram illustrating a state in which direct currents flow through magnetic field application layers of the heat-flow sensor included in the heat-flow measurement system according to the first example embodiment.

FIG. 3 is a conceptual diagram illustrating a state in which the currents flow through the first magnetic field application layer 12 and the second magnetic field application layer 16 by arrows. As illustrated in FIG. 3, the currents flow through the first magnetic field application layer 12 and the second magnetic field application layer 16 in directions opposite to each other. FIG. 3 illustrates an example in which the heat-flow measurement device 100 drives the direct-current power supply 110 to cause the current to flow from the first end 161 to the second end 162 of the second magnetic field application layer 16 and from the second end 122 to the first end 121 of the first magnetic field application layer 12.

Figure 4:
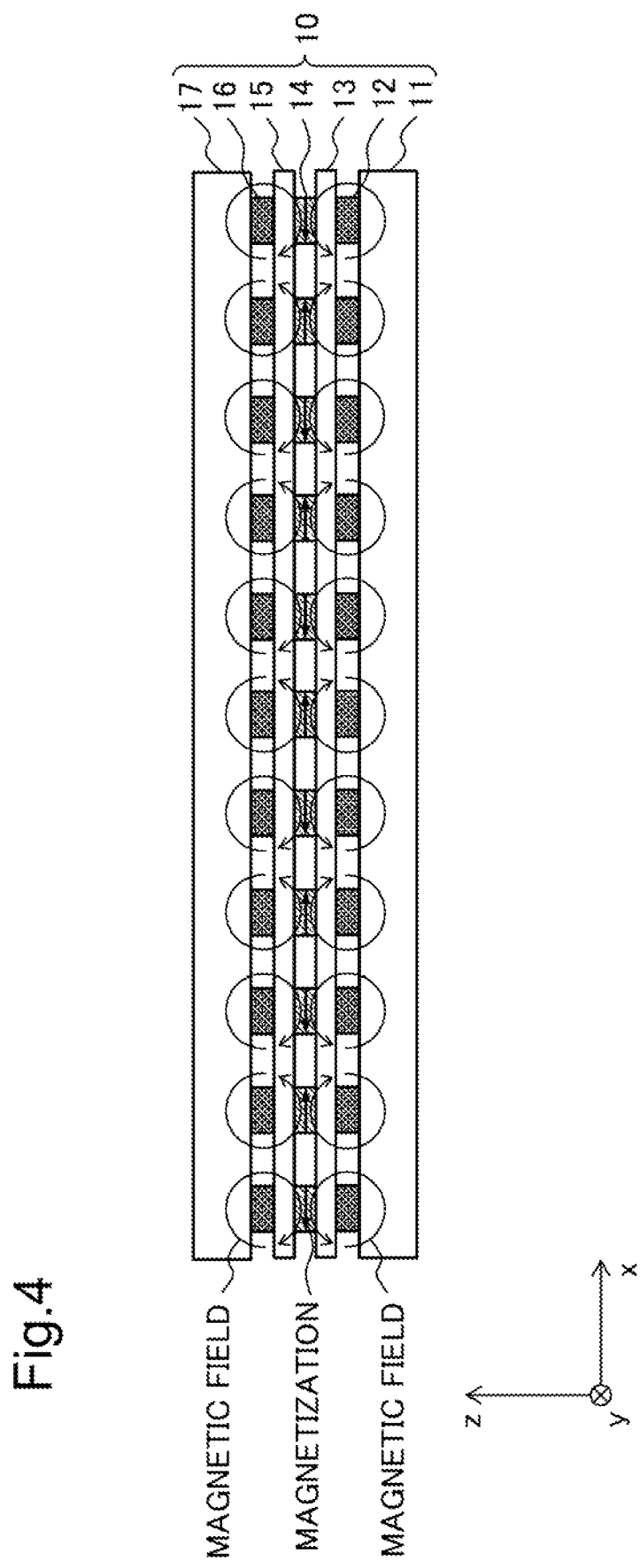
FIG. 4 is a conceptual diagram illustrating a state in which a heat-flow detection layer is magnetized when direct currents flow through the magnetic field application layers of the heat-flow sensor included in the heat-flow measurement system according to the first example embodiment.

FIG. 4 is a conceptual diagram illustrating a state in which the heat-flow detection layer 14 is magnetized by the magnetic fields generated in the first magnetic field application layer 12 and the second magnetic field application layer 16 when the currents flow through the first magnetic field application layer 12 and the second magnetic field application layer 16 as illustrated in FIG. 3. As illustrated in FIG. 4, when the currents flow through the first magnetic field application layer 12 and the second magnetic field application layer 16, the magnetic fields are generated around the wires constituting the first magnetic field application layer 12 and the second magnetic field application layer 16 according to the Ampere's law. The magnetic fields around the wires constituting the first magnetic field application layer 12 and the second magnetic field application layer 16 are added at the position of the wire constituting the heat-flow detection layer 14 and magnetize the heat-flow detection layer 14. As illustrated in FIG. 4, among the wires constituting the heat-flow detection layer 14, adjacent wires are magnetized in the directions opposite to each other.

In addition, the heat flow due to Joule heat is also generated from the inside of the heat-flow sensor 10 when the currents flow through the first magnetic field application layer 12 and the second magnetic field application layer 16. The heat-flow sensor 10 has a vertically symmetrical structure having the heat-flow detection layer 14 sandwiched between the first magnetic field application layer 12 and the second magnetic field application layer 16, and the first magnetic field application layer 12 and the second magnetic field application layer 16 are connected in series. Therefore, equal currents flow through the first magnetic field application layer 12 and the second magnetic field application layer 16. As a result, since the heat flow generated in the first magnetic field application layer 12 and the heat flow generated in the second magnetic field application layer 16 cancel each other in the heat-flow detection layer 14, the electromotive force is not generated in the heat-flow detection layer 14 in a state where there is no heat flow from the outside.

Figure 5:
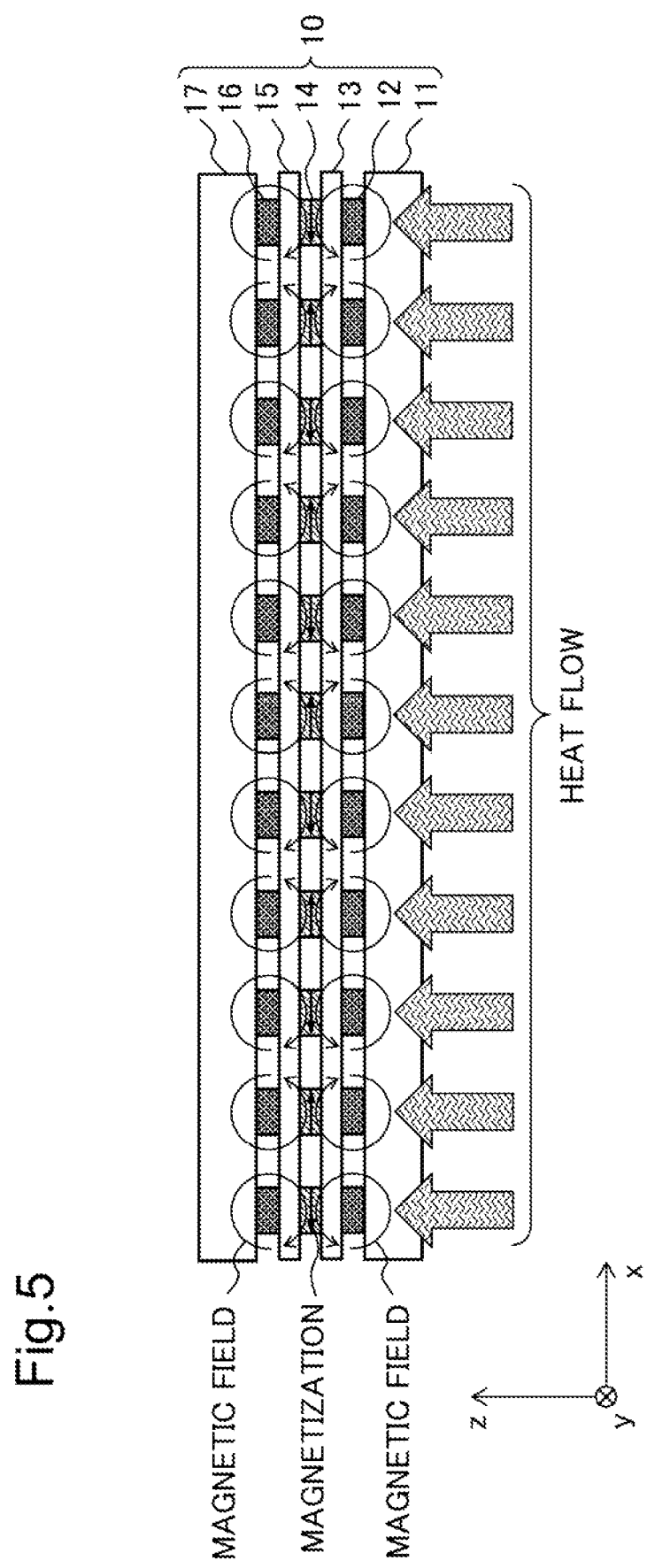
FIG. 5 is a conceptual diagram illustrating a state in which heat flow flows from an outside in a perpendicular direction to the heat-flow sensor included in the heat-flow measurement system according to the first example embodiment.
Figure 6:
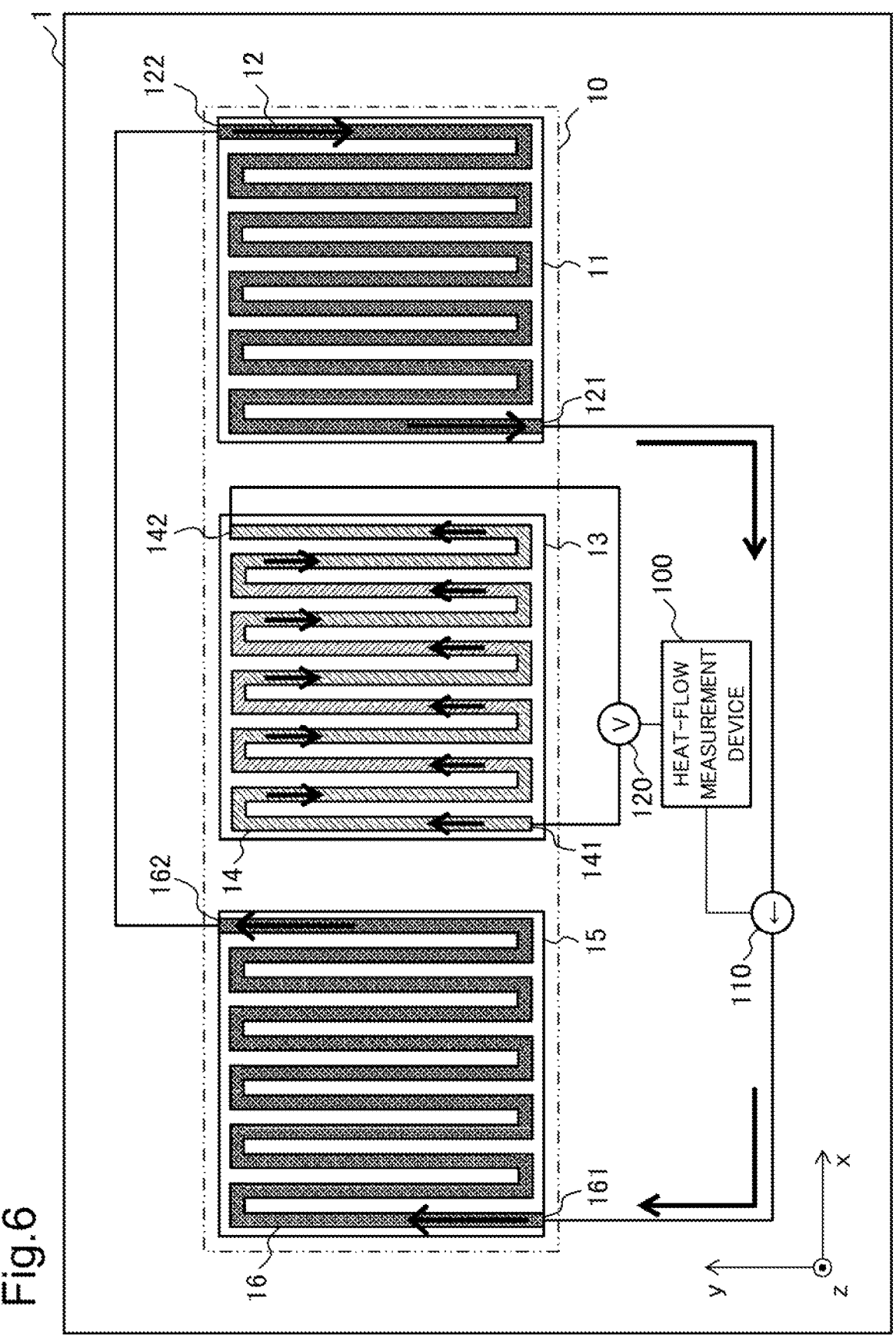
FIG. 6 is a conceptual diagram illustrating a state in which current flows in the heat-flow detection layer when heat flow flows from the outside in the perpendicular direction to the heat-flow sensor included in the heat-flow measurement system according to the first example embodiment.

FIG. 5 is a conceptual diagram illustrating a situation in which the heat flow has arrived from the outside in the state where the currents flow through the first magnetic field application layer 12 and the second magnetic field application layer 16 as illustrated in FIGS. 3 and 4. FIG. 6 is a conceptual diagram illustrating a state in which the electromotive force is generated in the heat-flow detection layer 14 and the current flows in the heat-flow detection layer 14 in the situation in which the heat flow has arrived from the outside in the state where the currents flow through the first magnetic field application layer 12 and the second magnetic field application layer 16.

When the heat flow passes through the heat-flow detection layer 14 from the first magnetic field application layer 12 toward the second magnetic field application layer 16 as illustrated in FIG. 5, the electromotive force due to the anomalous Nernst effect is generated in each conductive magnetic body constituting the heat-flow detection layer 14. As a result of the electromotive force generated at this time being added in the heat-flow detection layer 14 having the meander shape structure, an output voltage can be detected between the first end 141 and the second end 142 of the heat-flow detection layer 14. Since the output voltage between the first end 141 and the second end 142 of the heat-flow detection layer 14 is proportional to the heat-flow value, the heat flow passing through the heat-flow detection layer 14 can be measured by converting the detected output voltage into the heat-flow value.

The configuration of the heat-flow measurement system 1 of the present example embodiment has been described. The configuration of FIGS. 2 to 5 is an example of the configuration of the heat-flow measurement system 1, and the configuration of the heat-flow measurement system 1 of the present example embodiment is not limited to the configuration of FIGS. 2 to 5.

[Heat-Flow Measurement Device]

Figure 7:
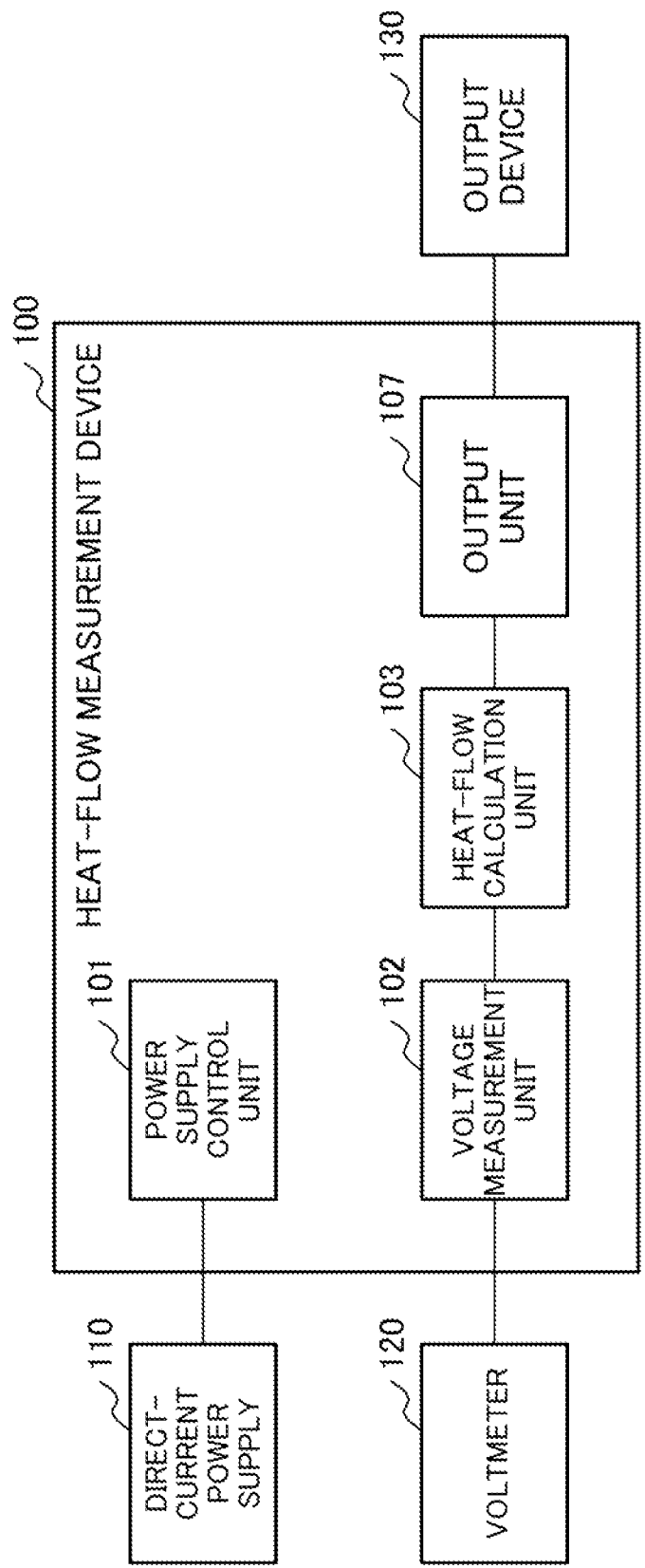
FIG. 7 is a block diagram illustrating an example of a configuration of a heat-flow measurement device included in the heat-flow measurement system according to the first example embodiment.

Next, the heat-flow measurement device 100 included in the heat-flow measurement system 1 of the present example embodiment will be described with reference to the drawings. FIG. 7 is a block diagram illustrating an example of a configuration of the heat-flow measurement device 100. As illustrated in FIG. 7, the heat-flow measurement device 100 includes a power supply control unit 101, a voltage measurement unit 102, a heat-flow calculation unit 103, and an output unit 107. FIG. 7 illustrates an example in which an output device 130 for outputting the heat-flow value measured by the heat-flow measurement device 100 is connected to the output unit 107.

The power supply control unit 101 is connected to the direct-current power supply 110. The power supply control unit 101 drives the direct-current power supply 110 to control the current flowing through the first magnetic field application layer 12 and the second magnetic field application layer 16. The current value of the current flowing through the first magnetic field application layer 12 and the second magnetic field application layer 16 by the power supply control unit 101 is a preset value. Note that the current value of the current flowing through the first magnetic field application layer 12 and the second magnetic field application layer 16 may be set to be changeable by the power supply control unit 101.

The voltage measurement unit 102 is connected to the voltmeter 120. Further, the voltage measurement unit 102 is connected to the heat-flow calculation unit 103. The voltage measurement unit 102 acquires the voltage value of the electromotive force generated in the heat-flow detection layer 14 from the voltmeter 120. The voltage measurement unit 102 outputs the acquired voltage value of the electromotive force of the heat-flow detection layer 14 to the heat-flow calculation unit 103.

The heat-flow calculation unit 103 is connected to the voltage measurement unit 102. The heat-flow calculation unit 103 is connected to the output unit 107. The heat-flow calculation unit 103 acquires the voltage value related to the electromotive force generated in the heat-flow detection layer 14 from the voltage measurement unit 102. The heat-flow calculation unit 103 converts the acquired voltage value into the heat-flow value. The heat-flow calculation unit 103 outputs the calculated heat-flow value to the output unit 107.

The output unit 107 acquires the heat-flow value from the heat-flow calculation unit 103. The output unit 107 outputs the acquired heat-flow value to the output device 130.

The output device 130 acquires the heat-flow value from the output unit 107. The output device 130 outputs the acquired heat-flow value. For example, the output device 130 is implemented by a display device having a monitor that displays information regarding the heat-flow value. Further, for example, the output device 130 is implemented by a printer that prints the information regarding the heat-flow value on a medium such as paper. Further, for example, the output device 130 is implemented by a speaker that notifies the information regarding the heat-flow value by sound. The output device 130 is not particularly limited as long as the output device can output the information regarding the heat-flow value.

The heat-flow measurement device 100 included in the heat-flow measurement system 1 of the present example embodiment has been described above. Note that the heat-flow measurement device 100 of FIG. 7 is an example, and the heat-flow measurement device 100 included in the heat-flow measurement system 1 of the present example embodiment is not limited to the form of FIG. 7.

(Operation)

Figure 8:
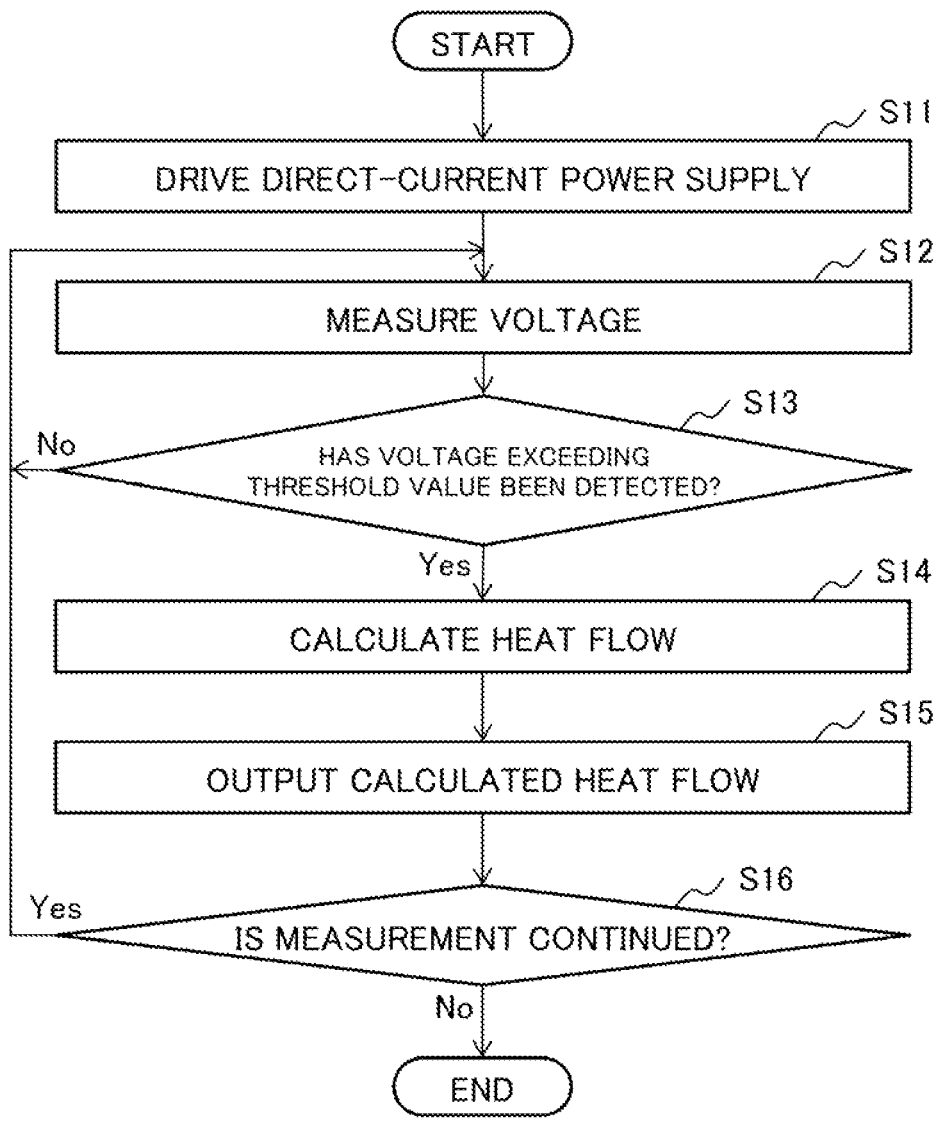
FIG. 8 is a flowchart for describing an example of an operation of the heat-flow measurement device included in the heat-flow measurement system according to the first example embodiment.

Next, an operation of the heat-flow measurement device 100 included in the heat-flow measurement system 1 of the present example embodiment will be described with reference to the drawings. FIG. 8 is a flowchart for describing an example of the operation of the heat-flow measurement device 100. In the description of the operation of the heat-flow measurement device 100 along the flowchart of FIG. 8, the components constituting the heat-flow measurement device 100 are the main constituents, but the heat-flow measurement device 100 can also be regarded as a main constituent.

In FIG. 8, first, the power supply control unit 101 of the heat-flow measurement device 100 drives the direct-current power supply 110 to cause the current to flow through the first magnetic field application layer 12 and the second magnetic field application layer 16 (step S11).

Next, the voltage measurement unit 102 of the heat-flow measurement device 100 measures the voltage value measured by the voltmeter 120 (step S12).

Here, in a case where the voltage value measured by the voltage measurement unit 102 of the heat-flow measurement device 100 does not exceed a threshold value (No in step S13), the processing returns to step S12.

On the other hand, in a case where the voltage value measured by the voltage measurement unit 102 of the heat-flow measurement device 100 exceeds the threshold value (Yes in step S13), the heat-flow calculation unit 103 of the heat-flow measurement device 100 calculates the heat-flow value using the voltage value (step S14).

Then, the output unit 107 of the heat-flow measurement device 100 outputs the calculated heat-flow value to the output device 130 (step S15).

Here, in a case where the measurement of the heat flow is continued (Yes in step S16), the processing returns to step S12. On the other hand, in a case where the measurement of the heat flow is terminated (No in step S16), the processing according to the flowchart of FIG. 8 is terminated.

The operation of the heat-flow measurement device 100 included in the heat-flow measurement system 1 of the present example embodiment has been described above. The operation of the heat-flow measurement device 100 of FIG. 8 is an example, and the operation of the heat-flow measurement device 100 included in the heat-flow measurement system 1 of the present example embodiment is not limited to the procedure of FIG. 8.

[Manufacturing Method]

Figure 9:
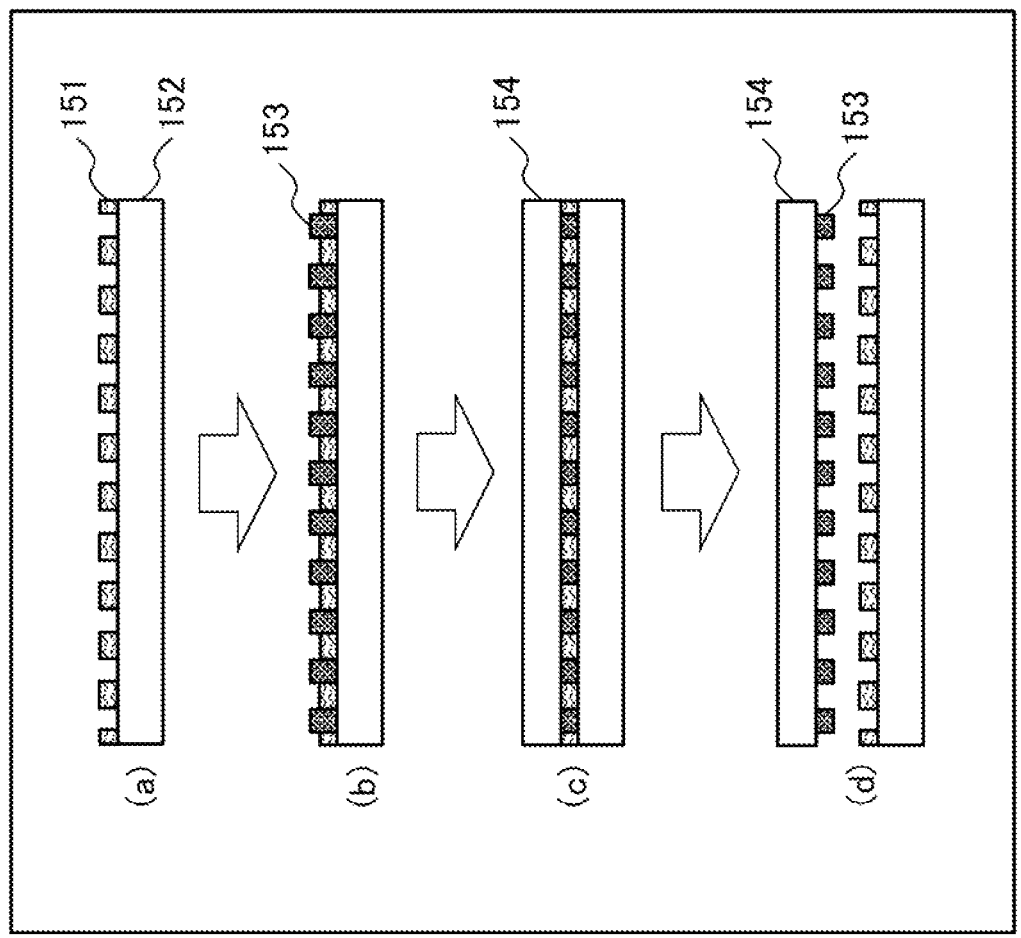
FIG. 9 is a conceptual diagram illustrating an example of a method of manufacturing the heat-flow detection layer included in the heat-flow measurement system according to the first example embodiment.

Next, a method of manufacturing the heat-flow detection layer 14 included in the heat-flow sensor 10 of the heat-flow measurement system 1 of the present example embodiment will be described with reference to the drawings. FIG. 9 is a conceptual diagram for describing an example of the method of manufacturing the heat-flow detection layer 14. FIG. 9 illustrates an example in which the heat-flow detection layer 14 is formed by plating.

FIG. 9(*a*) illustrates a plate in which an insulating layer 151 for forming a pattern of the heat-flow detection layer 14 is formed on a surface of a conductive base material 152.

FIG. 9(*b*) illustrates a state in which a plating layer 153 having the pattern of the heat-flow detection layer 14 is plated on the surface of the conductive base material 152. The plating layer 153 is formed on the surface of the conductive base material 152 that is not covered with the insulating layer 151. For example, the plating layer 153 is a soft magnetic material such as an iron-aluminum alloy or a permalloy.

FIG. 9(*c*) illustrates a state in which the plating layer 153 formed on the surface of conductive base material 152 is transferred to a transfer film 154. For example, the transfer film 154 is an insulating material such as polyimide. The transfer film 154 corresponds to the first insulating layer 13.

FIG. 9(*d*) illustrates a state in which the transfer film 154 (first insulating layer 13) is peeled off from the plate on which the insulating layer 151 for forming the pattern of the heat-flow detection layer 14 is formed on the surface of the conductive base material 152. As illustrated in FIG. 9(*d*), the plating layer 153 (heat-flow detection layer 14) is formed on one surface of the transfer film 154 (first insulating layer 13).

The above is description about the method of manufacturing the heat-flow detection layer 14 included in the heat-flow sensor 10 of the heat-flow measurement system 1 of the present example embodiment. Note that the method of manufacturing the heat-flow detection layer 14 in FIG. 9 is an example, and the method of manufacturing the heat-flow detection layer 14 of the present example embodiment is not limited to the procedure illustrated in FIG. 9.

As described above, the heat-flow sensor of the present example embodiment includes the substrate, the first magnetic field application layer, the first insulating layer, the heat-flow detection layer, the second insulating layer, and the second magnetic field application layer. The first magnetic field application layer is arranged on the upper surface of the substrate and is made of a conductor. The first insulating layer is arranged on the upper surface of the first magnetic field application layer. The heat-flow detection layer is arranged on the upper surface of the first insulating layer and is made of a conductive magnetic body. The second insulating layer is arranged on the upper surface of the heat-flow detection layer. The second magnetic field application layer is arranged on the upper surface of the second insulating layer and is made of a conductor. The heat-flow detection layer faces the first magnetic field application layer via the first insulating layer, and faces the second magnetic field application layer via the second insulating layer.

In one aspect of the present example embodiment, the patterns of the conductors constituting the first magnetic field application layer and the second magnetic field application layer, and the pattern of the conductive magnetic body constituting the heat-flow detection layer face each other. Further, in one aspect of the present example embodiment, each of the first magnetic field application layer and the second magnetic field application layer, and the heat-flow detection layer are provided via each of the first insulating layer and the second insulating layer, and the wire pattern of the heat-flow detection layer is provided facing the wire pattern of each of the first magnetic field application layer and the second magnetic field application layer. Further, in one aspect of the present example embodiment, the patterns of the conductors constituting the first magnetic field application layer and the second magnetic field application layer, and the pattern of the conductive magnetic body constituting the heat-flow detection layer have the same shape. Further, in one aspect of the present example embodiment, the line of the pattern of the conductive magnetic body constituting the heat-flow detection layer is arranged to extend along the line length of the pattern of the conductor constituting each of the first magnetic field application layer and the second magnetic field application layer in top view.

In one aspect of the present example embodiment, the heat-flow detection layer is made of a soft magnetic conductive magnetic body. In one aspect of the present example embodiment, the distance between the first magnetic field application layer and the heat-flow detection layer is equal to the distance between the second magnetic field application layer and the heat-flow detection layer. In one aspect of the present example embodiment, the first magnetic field application layer, the second magnetic field application layer, and the heat-flow detection layer are configured in the pattern having the shape in which one wire is folded back. In one aspect of the present example embodiment, the first magnetic field application layer, the second magnetic field application layer, and the heat-flow detection layer are configured in the meander pattern. In one aspect of the present example embodiment, the first magnetic field application layer and the second magnetic field application layer are thicker in the film thickness than the heat-flow detection layer.

In addition, the heat-flow measurement system of the present example embodiment includes the heat-flow sensor and the heat-flow measurement device described above. The heat-flow measurement device controls the current flowing through the first magnetic field application layer and the second magnetic field application layer, measures the voltage of the heat-flow detection layer, and converts the measured voltage value into a heat-flow value.

In the heat-flow measurement system according to one aspect of the present example embodiment, each of the first magnetic field application layer, the second magnetic field application layer, and the heat-flow detection layer has the first end and the second end. The first ends of the first magnetic field application layer and the second magnetic field application layer are electrically connected to each other. The second ends of the first magnetic field application layer and the second magnetic field application layer are connected via the direct-current power supply. The heat-flow measurement device performs control to cause the direct current to flow from the second end of either the first magnetic field application layer or the second magnetic field application layer, and measures the voltage between the first end and the second end of the heat-flow detection layer.

According to the present example embodiment, by configuring the heat-flow detection layer made of a conductive magnetic body to be sandwiched by the two magnetic field application layers, the magnetic field can be effectively applied in the in-plane direction of the heat-flow detection layer. In addition, according to the present example embodiment, since the current values of the currents flowing through the two magnetic field application layers are equal, it is possible to offset the heat flow caused by the Joule heat generated by the currents flowing through the two magnetic field application layers.

In addition, according to the present example embodiment, a locally different non-uniform magnetic field, not a uniform magnetic field from the outside, can be applied to the heat-flow detection layer made of the meander-shaped conductive magnetic body made of a single material. That is, according to the present example embodiment, since a stable magnetic field can be intensively applied to the portion of the meander-shaped conductive magnetic body constituting the heat-flow detection layer, a highly sensitive heat-flow sensor can be obtained.

That is, according to the heat-flow sensor of the present example embodiment, by non-uniformly magnetizing the heat-flow detection layer using the magnetic field application layers that generate non-uniform magnetic fields, it is possible to configure the thermoelectric layer having a high extraction voltage with a single material. In other words, according to the present example embodiment, it is possible to provide a highly sensitive thin-film heat-flow sensor that detects heat flow with a single conductive magnetic body.

Second Example Embodiment

Next, a heat-flow measurement system according to a second example embodiment will be described with reference to the drawings. The heat-flow measurement system of the present example embodiment is different from the heat-flow measurement system of the first example embodiment in including an alternating-current power supply instead of a direct-current power supply.

Figure 10:
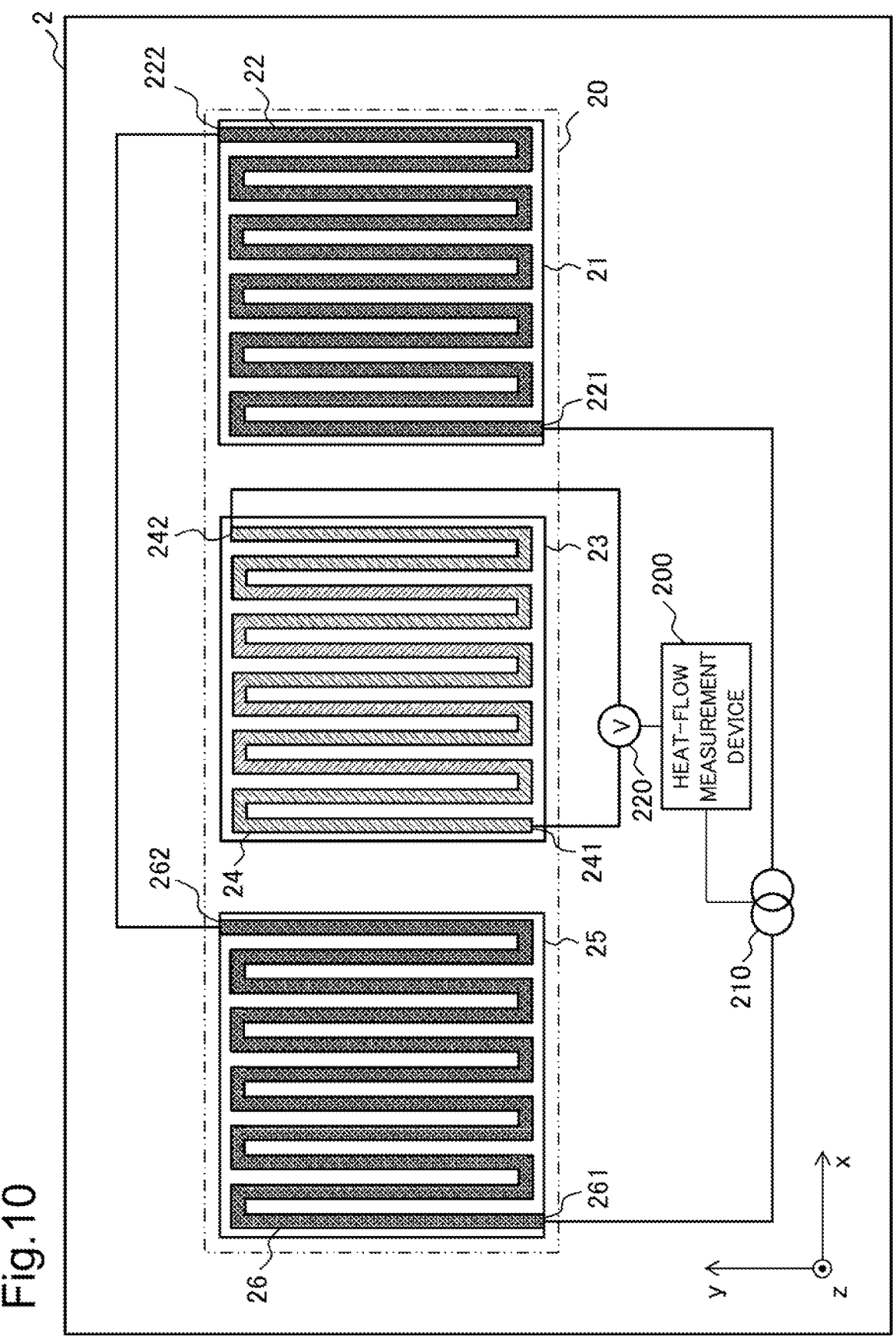
FIG. 10 is a conceptual diagram for describing a configuration of a heat-flow measurement system according to a second example embodiment.

FIG. 10 is a conceptual diagram illustrating an example of a configuration of a heat-flow measurement system 2 of the present example embodiment. As illustrated in FIG. 10, the heat-flow measurement system 2 includes a heat-flow sensor 20, a heat-flow measurement device 200, an alternating-current power supply 210, and a voltmeter 220. In FIG. 10, a first magnetic field application layer 22, a heat-flow detection layer 24, and a second magnetic field application layer 26, which are stacked in practice, are arranged side by side. The alternating-current power supply 210 outputs an alternating current with polarity switched in accordance with a set period.

The heat-flow sensor 20 has a similar structure to the heat-flow sensor 10 illustrated in FIG. 1. The heat-flow sensor 20 has a structure in which the first magnetic field application layer 22, a first insulating layer 23, the heat-flow detection layer 24, a second insulating layer 25, the second magnetic field application layer 26, and a cover layer (not illustrated) are sequentially stacked on an upper surface of a substrate 21. In practice, the first magnetic field application layer 22, the heat-flow detection layer 24, and the second magnetic field application layer 26 are stacked. In FIG. 10, the cover layer is omitted. Hereinafter, description of configurations similar to those of the heat-flow sensor 10 may be omitted. As an example, a surface on which the first magnetic field application layer 22 is arranged is referred to as a first surface, and a surface on which the heat-flow detection layer 24 is arranged is referred to as a second surface, of two main surfaces of the first insulating layer 23. Further, as an example, a surface on which the second magnetic field application layer 26 is arranged is referred to as a first surface, and a surface on which the heat-flow detection layer 24 is arranged is referred to as a second surface, of two main surfaces of the second insulating layer 25.

The first magnetic field application layer 22 has a first end 221 and a second end 222. The heat-flow detection layer 24 has a first end 241 and a second end 242. The second magnetic field application layer 26 has a first end 261 and a second end 262. For example, the first magnetic field application layer 22, the heat-flow detection layer 24, and the second magnetic field application layer 26 have a meander shape and overlap one another in top view.

The second end 222 of the first magnetic field application layer 22 is electrically connected to the second end 262 of the second magnetic field application layer 26. For example, in a state where the layers are stacked as illustrated in FIG. 1, the second end 222 of the first magnetic field application layer 22 and the second end 262 of the second magnetic field application layer 26 are electrically connected by wire (not illustrated) arranged along a side surface of the heat-flow sensor 20. The first end 221 of the first magnetic field application layer 22 is electrically connected to the first end 261 of the second magnetic field application layer 26 across the alternating-current power supply 210. The first end 241 of the heat-flow sensor 20 is electrically connected to the second end 242 of the heat-flow sensor 20. The voltmeter 220 is arranged between the first end 241 and the second end 242 of the heat-flow sensor 20.

The heat-flow measurement device 200 is connected to the alternating-current power supply 210 and the voltmeter 220. The heat-flow measurement device 200 drives the alternating-current power supply 210 to control the alternating current flowing through the first magnetic field application layer 22 and the second magnetic field application layer 26. In addition, the heat-flow measurement device 200 measures an electromotive force generated in the heat-flow detection layer 24 by passage of the heat flow, using the voltmeter 220.

The alternating-current power supply 210 outputs an alternating current according to the control of the heat-flow measurement device 200. The alternating-current power supply 210 is connected between the first end 261 of the second magnetic field application layer 26 and the first end 221 of the first magnetic field application layer 22.

The voltmeter 220 is an alternating-current voltmeter connected to the first end 241 and the second end 242 of the heat-flow detection layer 24. The voltmeter 220 measures the voltage between the first end 241 and the second end 242 of the heat-flow detection layer 24, and outputs a measured voltage value to the heat-flow measurement device 200.

The configuration of the heat-flow measurement system 2 of the present example embodiment has been described. Note that the configuration of FIG. 10 is an example of the configuration of the heat-flow measurement system 2, and the configuration of the heat-flow measurement system 2 of the present example embodiment is not limited to the configuration of FIG. 10.

[Heat-Flow Measurement Device]

Figure 11:
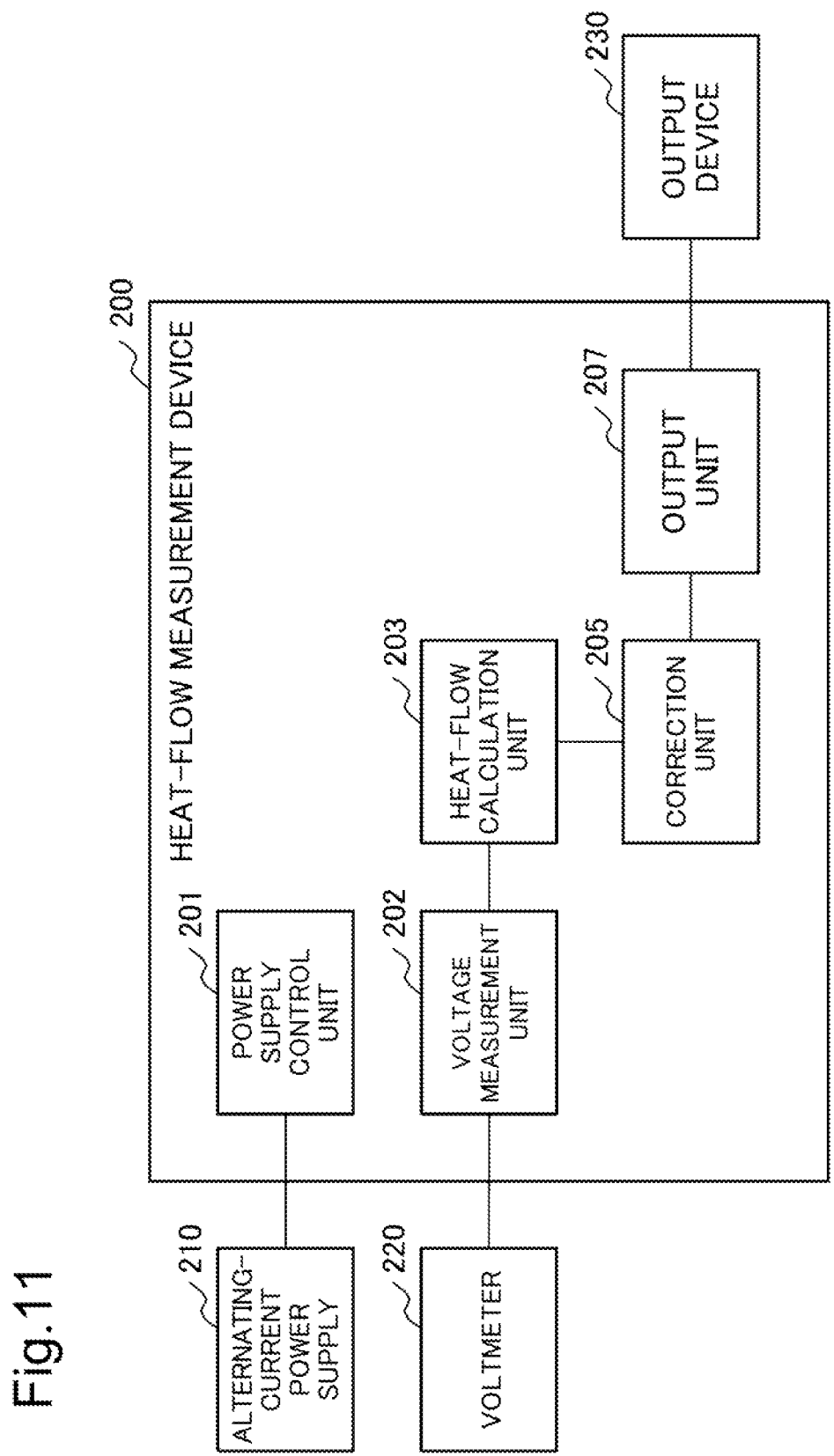
FIG. 11 is a block diagram illustrating an example of a configuration of a heat-flow measurement device included in the heat-flow measurement system according to the second example embodiment.

Next, the heat-flow measurement device 200 included in the heat-flow measurement system 2 of the present example embodiment will be described with reference to the drawings. FIG. 11 is a block diagram illustrating an example of a configuration of the heat-flow measurement device 200. As illustrated in FIG. 11, the heat-flow measurement device 200 includes a power supply control unit 201, a voltage measurement unit 202, a heat-flow calculation unit 203, a correction unit 205, and an output unit 207. FIG. 11 illustrates an example in which an output device 230 for outputting the amount of heat measured by the heat-flow measurement device 200 is connected to the output unit 207.

The power supply control unit 201 is connected to the alternating-current power supply 210. The power supply control unit 201 drives the alternating-current power supply 210 to control the alternating current flowing through the first magnetic field application layer 22 and the second magnetic field application layer 26. The current value of the current flowing through the first magnetic field application layer 22 and second magnetic field application layer 26 by the power supply control unit 201 is a preset value. Note that an effective value of the alternating current flowing through the first magnetic field application layer 22 and the second magnetic field application layer 26 may be set to be changeable by the power supply control unit 201.

The voltage measurement unit 202 is connected to the voltmeter 220. In addition, the voltage measurement unit 202 is connected to the heat-flow calculation unit 203. The voltage measurement unit 202 acquires the voltage value of the electromotive force generated in the heat-flow detection layer 24 from the voltmeter 220. The voltage measurement unit 202 outputs the acquired voltage value of the electromotive force of the heat-flow detection layer 24 to the heat-flow calculation unit 203.

Figure 12:
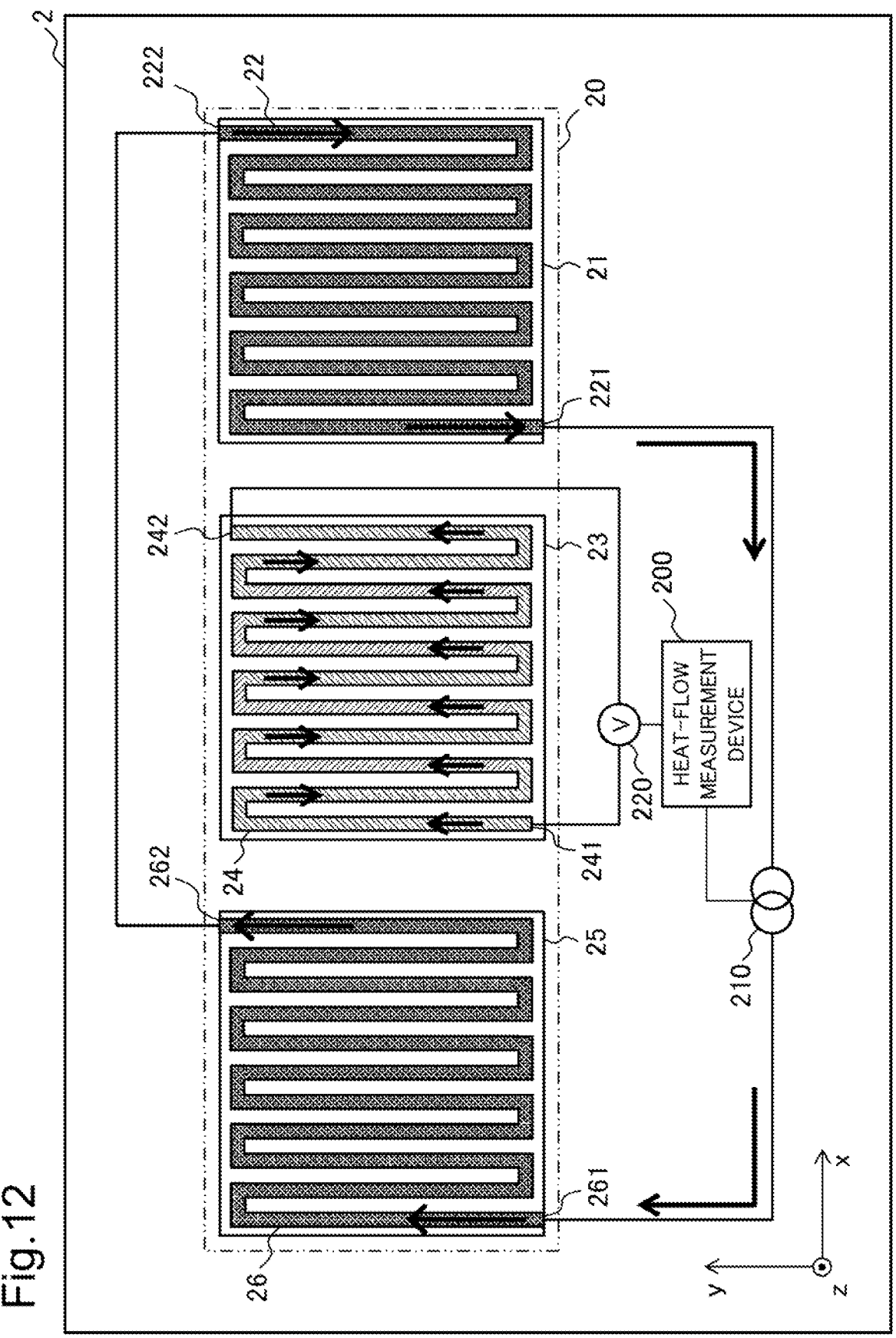
FIG. 12 is a conceptual diagram illustrating a state in which current flows in a heat-flow detection layer when heat flow flows from an outside in a perpendicular direction to a heat-flow sensor included in the heat-flow measurement system according to the second example embodiment.
Figure 13:
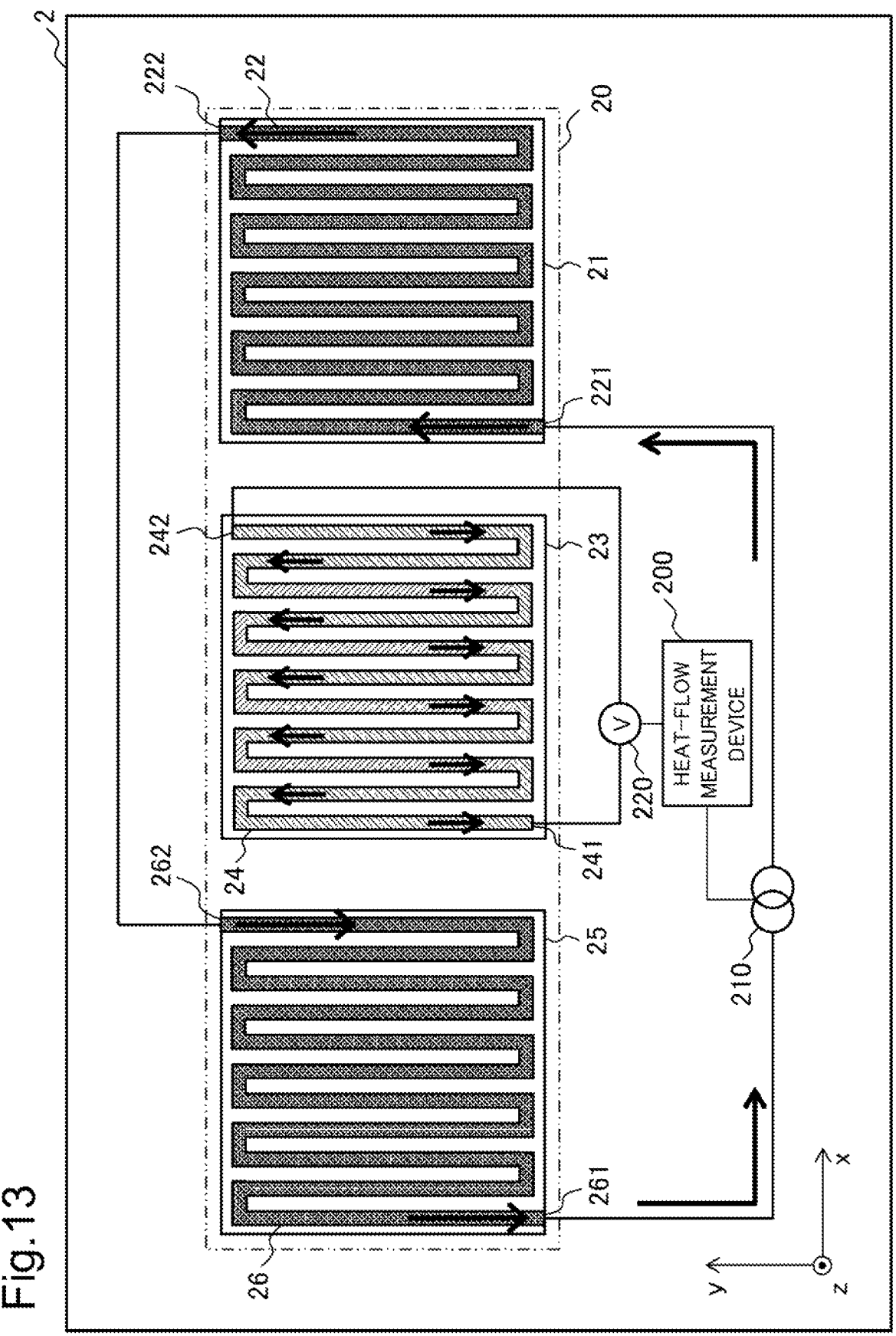
FIG. 13 is a conceptual diagram illustrating a state in which current flows in the heat-flow detection layer when heat flow flows from the outside in the perpendicular direction to the heat-flow sensor included in the heat-flow measurement system according to the second example embodiment.

Here, the voltage measured by the voltage measurement unit 202 will be described with reference to the drawings. FIGS. 12 and 13 are conceptual diagrams for describing that the direction of the current flowing through the heat-flow detection layer 24 changes depending on the direction of the currents flowing through the first magnetic field application layer 22 and the second magnetic field application layer 26 constituting the heat-flow sensor 20. In the examples of FIGS. 12 and 13, it is assumed that heat flow flows from the first magnetic field application layer 22 toward the second magnetic field application layer 26 in a perpendicular direction (+z direction) with respect to the heat-flow sensor 20.

FIG. 12 is a conceptual diagram illustrating a situation in which the current flows out from the alternating-current power supply 210 in a −x direction. In the example of FIG. 12, the current flowing in a +y direction from the first end 261 of the second magnetic field application layer 26 repeatedly changes the direction along the y direction and flows out from the second end 262. The current flowing out from the second end 262 of the second magnetic field application layer 26 flows in the −y direction from the second end 222 of the first magnetic field application layer 22. The current flowing in the −y direction from the second end 222 of the first magnetic field application layer 22 repeatedly changes the direction along the y direction and flows out from the first end 221.

In the example of FIG. 12, in the situation where the heat flow flows in the perpendicular direction (+z direction) from the first magnetic field application layer 22 toward the second magnetic field application layer 26, the current flows from the first end 241 toward the second end 242 of the heat-flow detection layer 24.

FIG. 13 is a conceptual diagram illustrating a situation in which the current flows out from the alternating-current power supply 210 in the +x direction. In the example of FIG. 13, the current flowing in the +y direction from the first end 221 of the first magnetic field application layer 22 repeatedly changes the direction along the y direction and flows out from the second end 222. The current flowing out from the second end 222 of the first magnetic field application layer 22 flows in the −y direction from the second end 262 of the second magnetic field application layer 26. The current flowing in the −y direction from the second end 262 of the second magnetic field application layer 26 repeatedly changes the direction along the y direction and flows out from the first end 261.

In the example of FIG. 13, in the situation where the heat flow flows in perpendicular direction (+z direction) from the first magnetic field application layer 22 toward the second magnetic field application layer 26, the current flows from the second end 242 toward the first end 241 of the heat-flow detection layer 24.

The heat-flow calculation unit 203 is connected to the voltage measurement unit 202. In addition, the heat-flow calculation unit 203 is connected to the correction unit 205. The heat-flow calculation unit 203 acquires the voltage value related to the electromotive force generated in the heat-flow detection layer 24 from the voltage measurement unit 202. The heat-flow calculation unit 203 converts the acquired voltage value into a heat-flow value. The heat-flow calculation unit 203 outputs the calculated heat-flow value to the correction unit 205. The polarity of the heat-flow value calculated by the heat-flow calculation unit 203 is periodically changed according to the direction in which the current flows.

The correction unit 205 acquires the heat-flow value calculated by the heat-flow calculation unit 203. The correction unit 205 corrects the acquired heat-flow value. As an example, the correction unit 205 sets an average value of a maximum value and a minimum value of the heat-flow value as a baseline, and corrects the heat-flow value in accordance with the baseline. The correction unit 205 outputs the corrected heat-flow value to the output unit 207.

Figure 14:
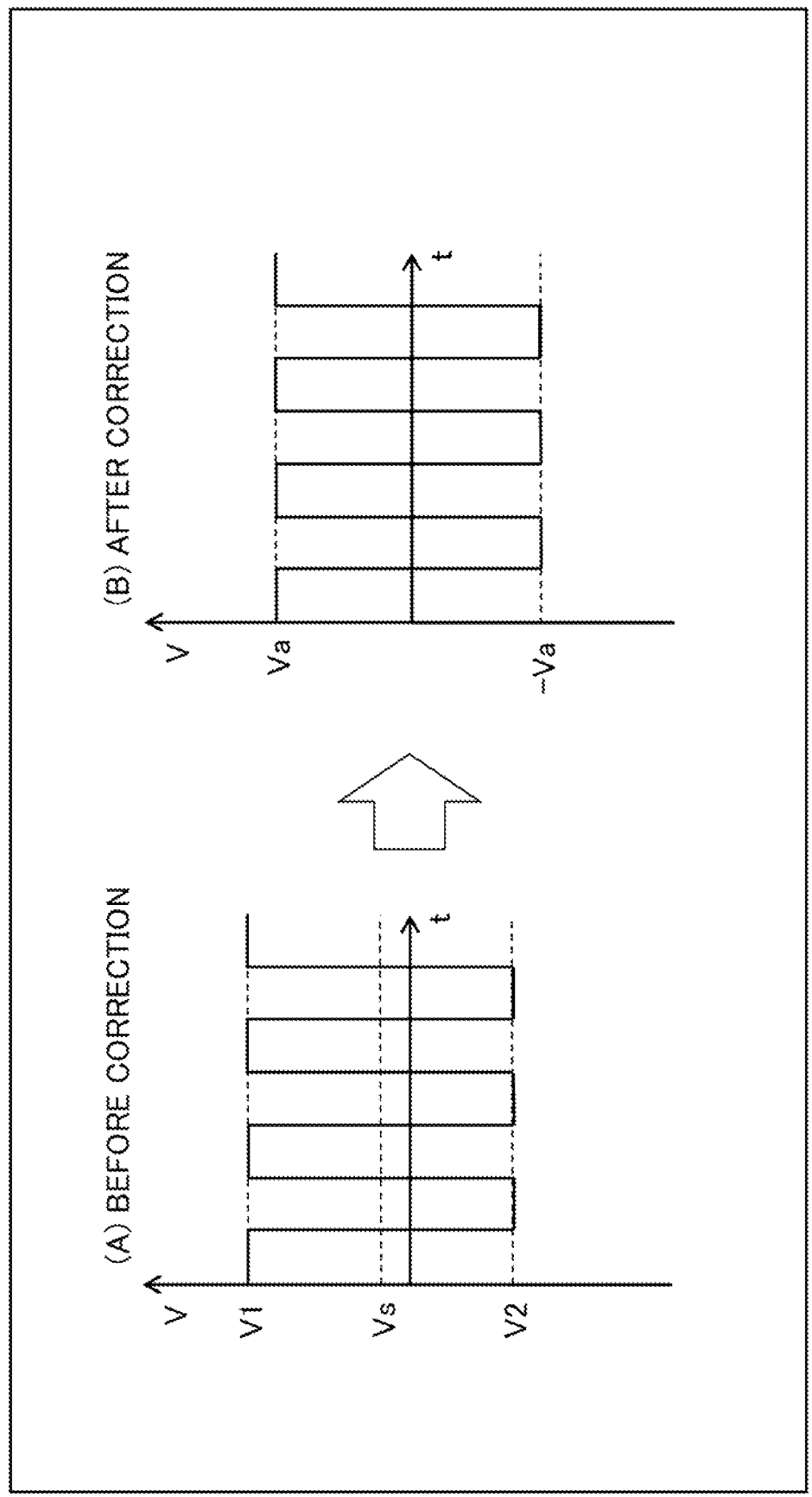
FIG. 14 is a conceptual diagram for describing a voltage detected by a heat-flow detection layer when an alternating current flows through the magnetic field application layer of the heat-flow sensor included in the heat-flow measurement system according to the second example embodiment.

FIG. 14 is a conceptual diagram illustrating a temporal change of the voltage value with the polarity changing according to the current flowing from the alternating-current power supply 210 in the situation where the heat flow flows in the substantially perpendicular direction (+z direction) from the first magnetic field application layer 22 toward the second magnetic field application layer 26.

For example, a case where a heat flow component in an in-plane direction (xy plane) is present in addition to a heat flow component in the perpendicular direction (z direction), or a case where a heat flow distribution in an element surface is non-uniform due to a large heat flow distribution is assumed. In such a case, when the heat flow flows in the substantially perpendicular direction (+z direction) from the first magnetic field application layer 22 toward the second magnetic field application layer 26, an offset voltage of an electromotive force caused by the Seebeck effect may be applied to the heat-flow detection layer 14 in addition to an electromotive force caused by the anomalous Nernst effect. Since the electromotive force caused by the anomalous Nernst effect is generated perpendicular to a heat flow direction, the electromotive force (voltage value V) in the in-plane direction generated between the first end and the second end of the heat-flow detection layer 14 is proportional to the heat flow in the perpendicular direction (z direction). In contrast, since the electromotive force caused by the Seebeck effect is generated along the heat flow direction, the electromotive force (voltage value V) in the in-plane direction generated between the first end and the second end depends on the heat flow in the in-plane direction (in xy-plane direction). Therefore, a voltage value V1 detected when the current flows out from the alternating-current power supply 210 in the +x direction and a voltage value V2 detected when the current flows out from the alternating-current power supply 210 in the −x direction are shifted by the contribution of the Seebeck effect.

In the present example embodiment, the direction of an electromotive force Va in the perpendicular direction (z direction) caused by the anomalous Nernst effect changes according to the change in the polarity of the alternating current from the alternating-current power supply 210. In contrast, the direction of an electromotive force Vs in the perpendicular direction (z direction) caused by the Seebeck effect does not change according to the change in the polarity of the alternating current from the alternating-current power supply 210. Therefore, by calculating an average value of the voltage value V1 and the voltage value V2 using the following equation 4, the electromotive force Vs caused by the Seebeck effect is removed, and the electromotive force Va caused by the anomalous Nernst effect can be calculated.

$$|Va|=(V1+V2)/2 \quad (4)$$

The output unit 207 acquires the heat-flow value from the correction unit 205. The output unit 207 outputs the acquired heat-flow value to the output device 230.

The output device 230 acquires the heat-flow value from the output unit 207. The output device 230 outputs the acquired heat-flow value. For example, the output device 230 is implemented by a display device having a monitor that displays information regarding the heat-flow value. Further, for example, the output device 230 is implemented by a printer that prints the information regarding the heat-flow value on a medium such as paper. Further, for example, the output device 230 is implemented by a speaker that notifies the information regarding the heat-flow value by sound. The output device 230 is not particularly limited as long as the output device can output the information regarding the heat-flow value.

The heat-flow measurement device 200 included in the heat-flow measurement system 2 of the present example embodiment has been described above. Note that the heat-flow measurement device 200 of FIG. 11 is an example, and the heat-flow measurement device 200 included in the heat-flow measurement system 2 of the present example embodiment is not limited to the form of FIG. 11.

(Operation)

Figure 15:
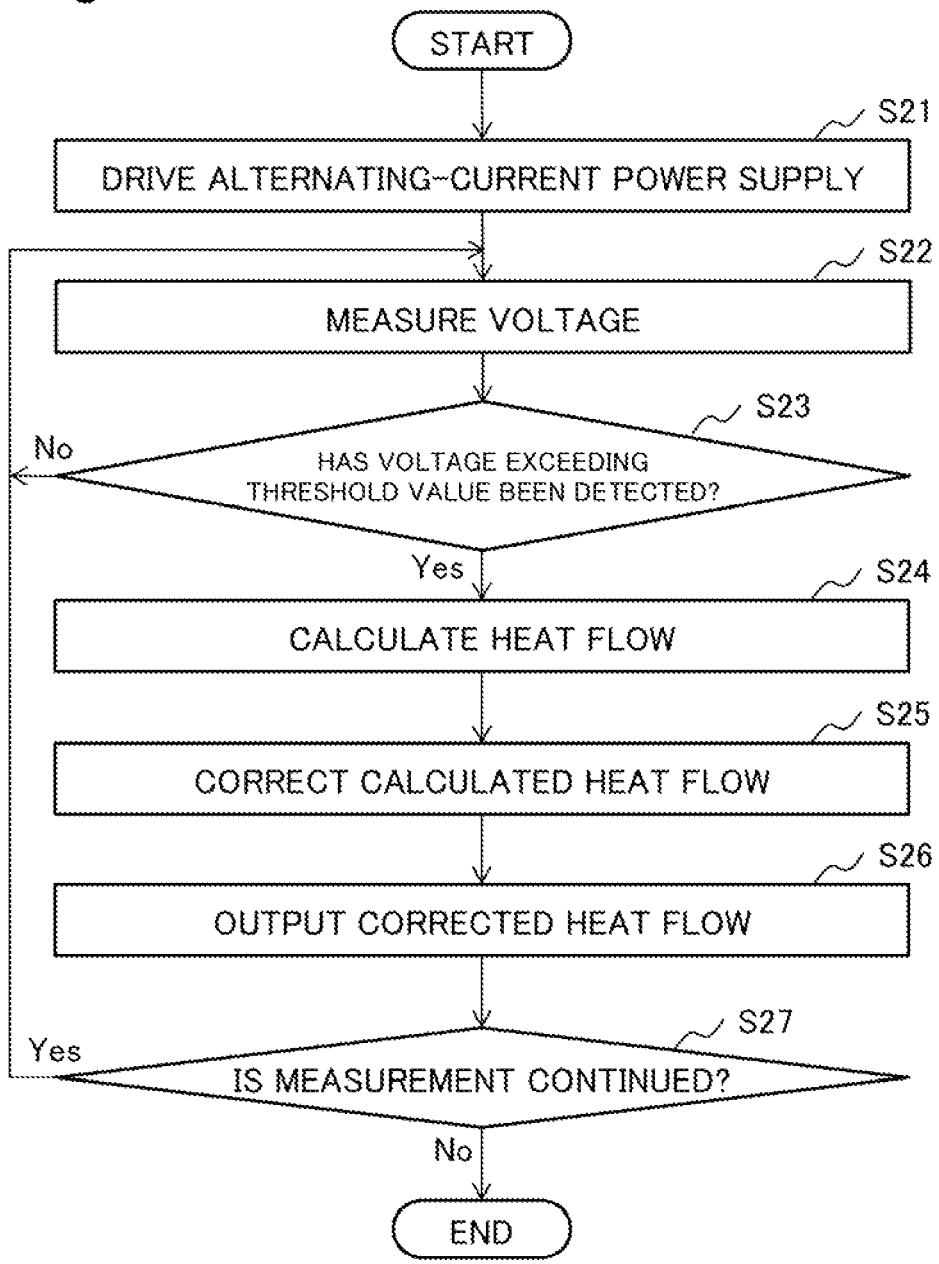
FIG. 15 is a flowchart for describing an example of an operation of the heat-flow measurement device included in the heat-flow measurement system according to the second example embodiment.

Next, an operation of the heat-flow measurement device 200 included in the heat-flow measurement system 2 of the present example embodiment will be described with reference to the drawings. FIG. 15 is a flowchart for describing an example of the operation of the heat-flow measurement device 200. In the description of the operation of the heat-flow measurement device 200 along the flowchart of FIG. 15, the components constituting the heat-flow measurement device 200 are the main constituents, but the heat-flow measurement device 200 can also be regarded as a main constituent.

In FIG. 15, first, the power supply control unit 201 of the heat-flow measurement device 200 drives the alternating-current power supply 210 to cause the current to flow through the first magnetic field application layer 22 and the second magnetic field application layer 26 (step S21).

Next, the voltage measurement unit 202 of the heat-flow measurement device 200 measures the voltage value measured by the voltmeter 220 (step S22).

Here, in a case where the voltage value measured by the voltage measurement unit 202 of the heat-flow measurement device 200 does not exceed a threshold value (No in step S23), the processing returns to step S22.

On the other hand, in a case where the voltage value measured by the voltage measurement unit 202 of the heat-flow measurement device 200 exceeds the threshold value (Yes in step S23), the heat-flow calculation unit 203 of the heat-flow measurement device 200 calculates the heat-flow value using the voltage value (step S24).

Next, the correction unit 205 of the heat-flow measurement device 200 corrects the heat-flow value calculated by the heat-flow calculation unit 203 (step S25).

Then, the output unit 207 of the heat-flow measurement device 200 outputs the calculated heat-flow value to the output device 230 (step S26).

Here, in a case where the measurement of the heat flow is continued (Yes in step S27), the processing returns to step S22. On the other hand, in a case where the measurement of the heat flow is terminated (No in step S27), the processing according to the flowchart of FIG. 15 is terminated.

The operation of the heat-flow measurement device 200 included in the heat-flow measurement system 2 of the present example embodiment has been described above. The operation of the heat-flow measurement device 200 of FIG. 15 is an example, and the operation of the heat-flow measurement device 200 included in the heat-flow measurement system 2 of the present example embodiment is not limited to the procedure of FIG. 15.

As described above, the heat-flow measurement system of the present example embodiment includes the heat-flow sensor and the heat-flow measurement device described above. The heat-flow measurement device controls the current to flow through the first magnetic field application layer and the second magnetic field application layer, measures the voltage of the heat-flow detection layer, and converts the measured voltage value into the heat-flow value.

In the heat-flow measurement system according to one aspect of the present example embodiment, each of the first magnetic field application layer, the second magnetic field application layer, and the heat-flow detection layer has the first end and the second end. The first ends of the first magnetic field application layer and the second magnetic field application layer are electrically connected to each other. The second ends of the first magnetic field application layer and the second magnetic field application layer are connected via the alternating-current power supply. The heat-flow measurement device performs control to cause the alternating current to flow from the second end of each of the first magnetic field application layer and the second magnetic field application layer, and measures the voltage between the first end and the second end of the heat-flow detection layer.

In one aspect of the present example embodiment, the heat-flow measurement device sets the average value of the maximum value and the minimum value of the voltage between the first end and the second end of the heat-flow detection layer as the baseline and corrects the heat-flow value.

According to the present example embodiment, a locally different non-uniform magnetic field in which the direction is periodically changed can be applied to the heat-flow detection layer made of the meander-shaped conductive magnetic body made of a single material. According to the present example embodiment, since the electromotive force caused by the Seebeck effect generated in the in-plane direction can be removed by the heat flow flowing in the perpendicular direction of the heat-flow sensor, using the fact that magnetization of the heat-flow sensor is periodically reversed by the alternating current, a highly accurate heat-flow sensor can be obtained.

Further, according to the present example embodiment, the offset signal that can be caused by the Seebeck effect, noise, or the like can be determined, and the offset signal can be removed. Moreover, according to the present example embodiment, more highly sensitive heat flow sensing can be implemented by lock-in detection or the like.

For example, in a case where the heat flow to be measured is small, the voltage signal caused by the heat flow may be buried in noise of various frequencies. According to the method of the present example embodiment, since it is known that the signal caused by the heat flow is modulated at the same frequency as the alternating current, noise of other frequency components can be removed by cutting off only the frequency component with a filter. As a result, according to the method of the present example embodiment, the voltage signal caused by the heat flow buried in the noise of various frequencies can be extracted with high sensitivity.

Third Example Embodiment

Next, a heat-flow measurement system according to a third example embodiment will be described with reference to the drawings. The heat-flow measurement system of the present example embodiment is different from the heat-flow measurement system of the first example embodiment in that a magnetic field application layer is formed of one layer. Hereinafter, the heat-flow sensor will be described, and then the heat-flow measurement system including the heat-flow sensor will be described.

[Heat-Flow Sensor]

Figure 16:
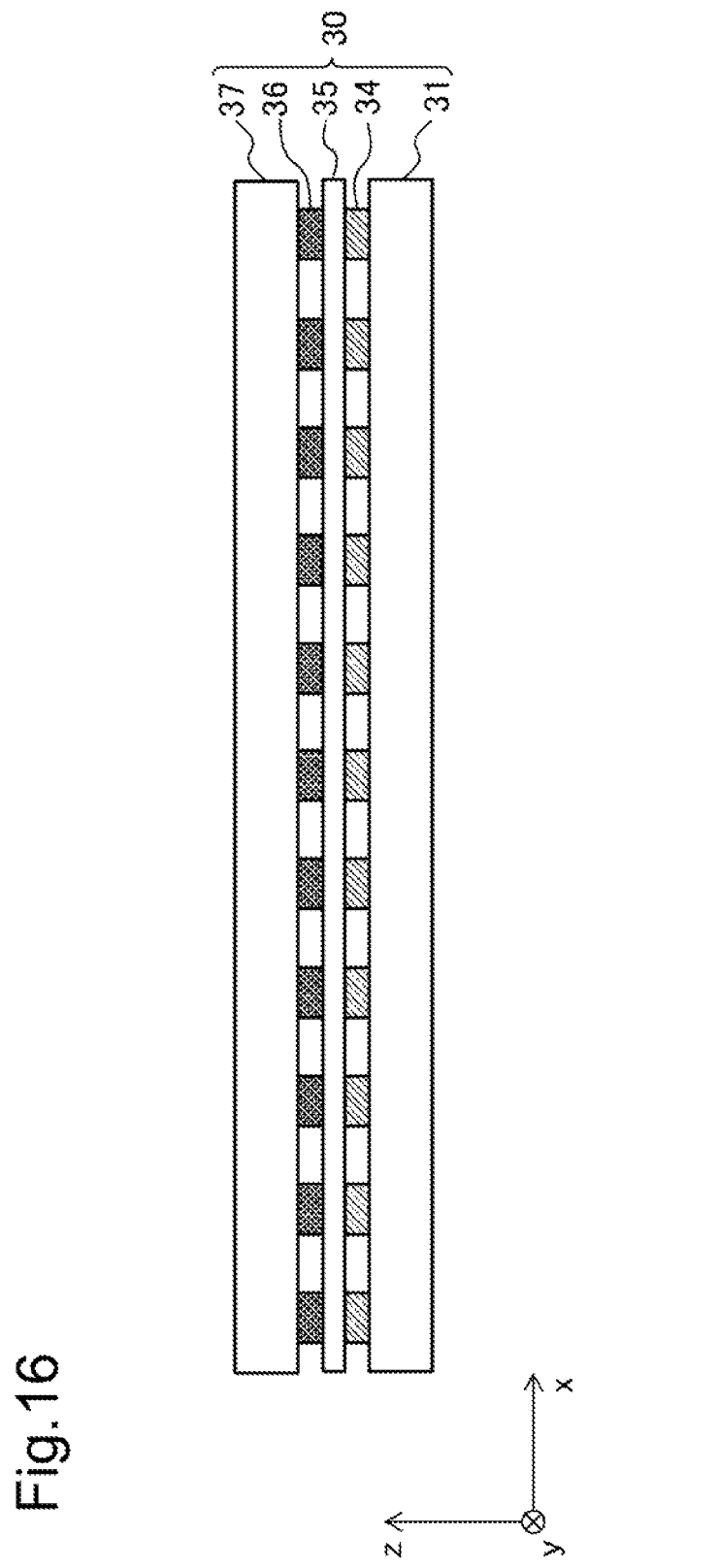
FIG. 16 is a conceptual diagram illustrating an example of a structure of a heat-flow sensor according to a third example embodiment.

FIG. 16 is a conceptual diagram illustrating an example of a configuration of a heat-flow sensor 30 included in a heat-flow measurement system of the present example embodiment. The heat-flow sensor 30 has a flat plate-like appearance. FIG. 16 is a side view of the flat plate-like heat-flow sensor 30 as viewed from a side.

The heat-flow sensor 30 includes a substrate 31, a heat-flow detection layer 34, an insulating layer 35, a magnetic field application layer 36, and a cover layer 37.

The substrate 31 is a base material having an upper surface on which the heat-flow detection layer 34 is formed. The substrate 31 is made of a material that easily conducts heat flow. For example, the substrate 31 is made of polyimide. Note that the material of the substrate 31 is not limited to polyimide as long as heat flow is easily conducted.

The heat-flow detection layer 34 is arranged between the substrate 31 and the insulating layer 35. The heat-flow detection layer 34 is a conductive magnetic body formed in a predetermined pattern having a first end and a second end. For example, a pattern of a conductor constituting the magnetic field application layer 36 and the pattern of the conductive magnetic body constituting the heat-flow detection layer 34 face each other. For example, the pattern of the conductor constituting the magnetic field application layer 36 and the pattern of the conductive magnetic body constituting the heat-flow detection layer 34 have the same shape. For example, the magnetic field application layer 36 and the heat-flow detection layer 34 are arranged such that a line of one pattern extends along a line length of the other pattern in top view.

The heat-flow detection layer 34 is favorably implemented by a soft magnetic thin film that is easily magnetized in an in-plane direction (direction in an xy plane) of the heat-flow sensor. For example, the heat-flow detection layer 34 can be implemented by a material such as an iron-aluminum alloy or a permalloy. For example, the heat-flow detection layer 34 favorably has a shape having a long effective length in order to enhance sensing sensitivity. For example, the heat-flow detection layer 34 has a meander shape in which the first end and the second end are arranged at positions separated from each other in top view. The shape of the heat-flow detection layer 34 is not limited to the meander shape as long as the line length of the wire from the first end to the second end can be made long.

The insulating layer 35 is an insulator arranged between the heat-flow detection layer 34 and the magnetic field application layer 36. As an example, a surface on which the magnetic field application layer 36 is arranged is referred to as a first surface, and a surface on which the heat-flow detection layer 34 is arranged is referred to as a second surface, of two main surfaces of the insulating layer 35. For example, the insulating layer 35 is made of polyimide. Note that the material of the insulating layer 35 is not limited to polyimide as long as the material has insulating properties.

The magnetic field application layer 36 is formed on an upper surface of the insulating layer 35. The magnetic field application layer 36 is a conductor formed in a predetermined pattern having a first end and a second end. For example, the magnetic field application layer 36 is formed in the similar pattern to the heat-flow detection layer 34. For example, the heat-flow detection layer 34 and the magnetic field application layer 36 overlap each other in top view. For example, the magnetic field application layer 36 has a meander shape in which the first end and the second end are arranged at positions separated from each other in top view. The shape of the magnetic field application layer 36 is not limited to the meander shape as long as the line length of the wire from the first end to the second end can be made long.

For example, the magnetic field application layer 36 is made of a metal material such as copper, aluminum, or gold. Note that the material of the magnetic field application layer 36 is not limited to the metal material such as copper, aluminum, or gold as long as the material is conductive. For example, the magnetic field application layer 36 can be formed by plating. The magnetic field application layer 36 may be formed by a method other than plating.

The cover layer 37 is formed on an upper surface of the magnetic field application layer 36. The cover layer 37 is a protective layer that protects the heat-flow sensor 30. The cover layer 37 is favorably made of an insulating material having high mechanical strength, chemical stability, heat resistance, and the like. For example, the cover layer 37 is made of polyimide. Note that the material of the cover layer 37 is not limited to polyimide as long as the material has sufficient mechanical strength, chemical stability, heat resistance, and the like.

A magnetic field is generated at a position of the heat-flow detection layer 34 due to current flowing through the magnetic field application layer 36. The heat-flow detection layer 34 is magnetized in the in-plane direction (in-xy-plane direction) of the heat-flow sensor 30 by the magnetic field applied by the magnetic field application layer 36.

By using the equations 1 to 3 of the first example embodiment, a heat-flow value q related to a voltage value can be calculated using a voltage value V related to an electromotive force generated in the heat-flow detection layer 34.

The configuration of the heat-flow sensor 30 included in the heat-flow measurement system of the present example embodiment has been described above. Note that the configuration of FIG. 16 is an example of the configuration of the heat-flow sensor 30, and the configuration of the heat-flow sensor 30 included in the heat-flow measurement system of the present example embodiment is not limited to the configuration of FIG. 16.

[Heat-Flow Measurement System]

Next, the heat-flow measurement system according to the present example embodiment will be described with reference to the drawings. The heat-flow measurement system of the present example embodiment includes a direct-current power supply for causing current to flow through the magnetic field application layer 36 of the heat-flow sensor 30.

Figure 17:
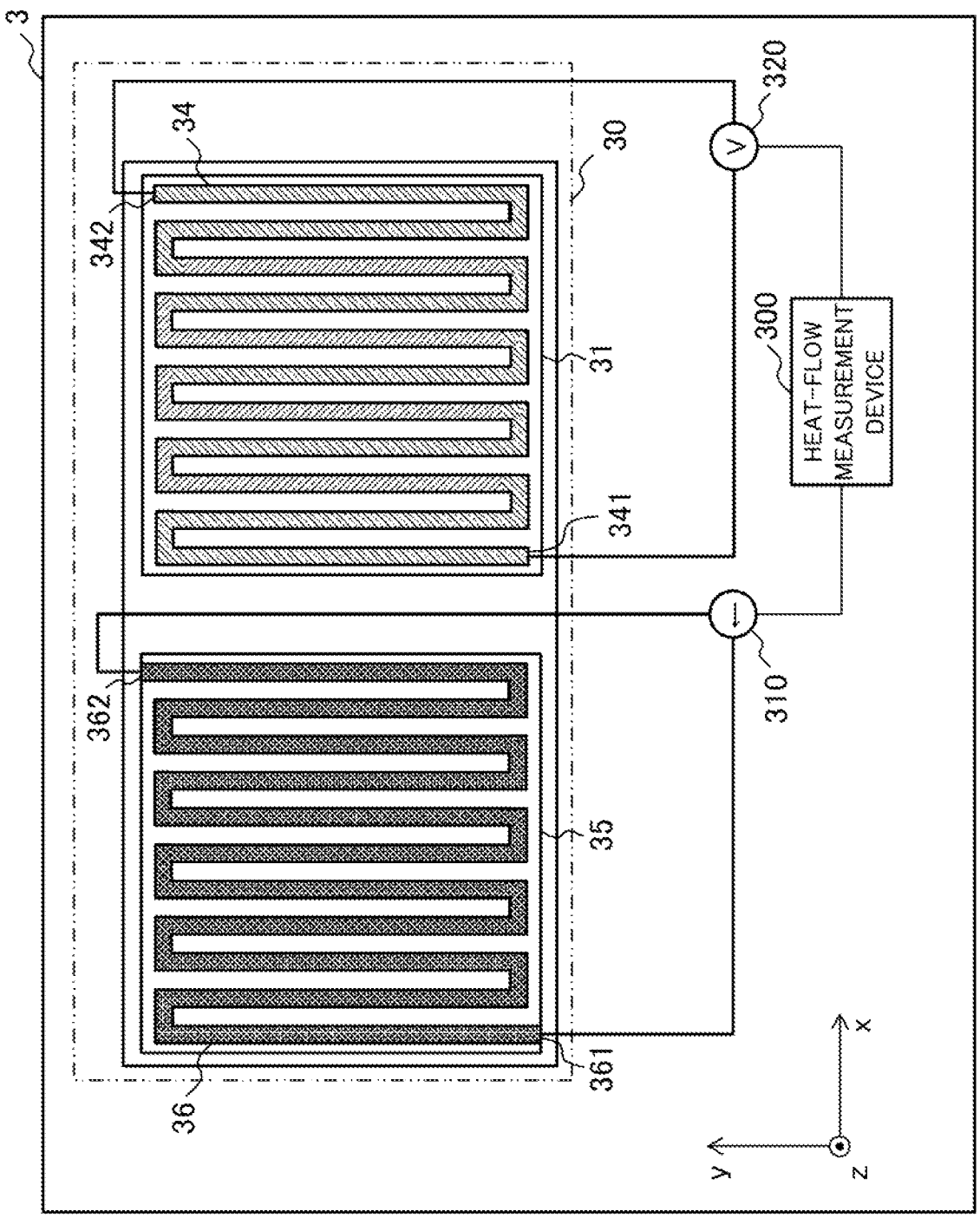
FIG. 17 is a conceptual diagram for describing a configuration of a heat-flow measurement system according to the third example embodiment.

FIG. 17 is a conceptual diagram illustrating an example of a configuration of a heat-flow measurement system 3 of the present example embodiment. As illustrated in FIG. 17, the heat-flow measurement system 3 includes the heat-flow sensor 30, a heat-flow measurement device 300, a direct-current power supply 310, and a voltmeter 320. In FIG. 17, the heat-flow detection layers 34 and magnetic field application layers 36, which are stacked in practice, are virtually arranged side by side.

The heat-flow sensor 30 has a structure illustrated in FIG. 16. As illustrated in FIG. 16, the heat-flow sensor 30 includes the substrate 31, the heat-flow detection layer 34, the insulating layer 35, the magnetic field application layer 36, and the cover layer 37. In practice, the heat-flow detection layer 34 and the magnetic field application layer 36 are stacked. In FIG. 17, the cover layer 37 is omitted.

The heat-flow detection layer 34 has a first end 341 and a second end 342. The magnetic field application layer 36 has a first end 361 and a second end 362. The heat-flow detection layer 34 and the magnetic field application layer 36 have a meander shape and overlap each other in top view.

The second end 362 of the magnetic field application layer 36 is electrically connected to the first end 361 of the magnetic field application layer 36 across the direct-current power supply 310. The first end 341 of the heat-flow sensor 30 is electrically connected to the second end 342 of the heat-flow sensor 30. The voltmeter 320 is arranged between the first end 341 and the second end 342 of the heat-flow sensor 30.

The heat-flow measurement device 300 is connected to direct-current power supply 310 and voltmeter 320. The heat-flow measurement device 300 drives the direct-current power supply 310 to control the current flowing through the magnetic field application layer 36. In addition, the heat-flow measurement device 300 measures an electromotive force generated in the heat-flow detection layer 34 by passage of the heat flow, using the voltmeter 320.

The direct-current power supply 310 outputs the direct current according to the control of the heat-flow measurement device 300. The direct-current power supply 310 has a positive electrode connected to the first end 361 of the magnetic field application layer 36, and a negative electrode connected to the second end 362 of the magnetic field application layer 36. In a case where the direction of the current flowing in the magnetic field application layer 36 is configured to be opposite, the direct-current power supply 310 has the negative electrode connected to the first end 361 of the magnetic field application layer 36 and the positive electrode connected to the second end 362 of the magnetic field application layer 36.

The voltmeter 320 is a direct-current voltmeter connected to the first end 341 and the second end 342 of the heat-flow detection layer 34. The voltmeter 320 measures a voltage between the first end 341 and the second end 342 of the heat-flow detection layer 34, and outputs a measured voltage value to the heat-flow measurement device 300.

Figure 18:
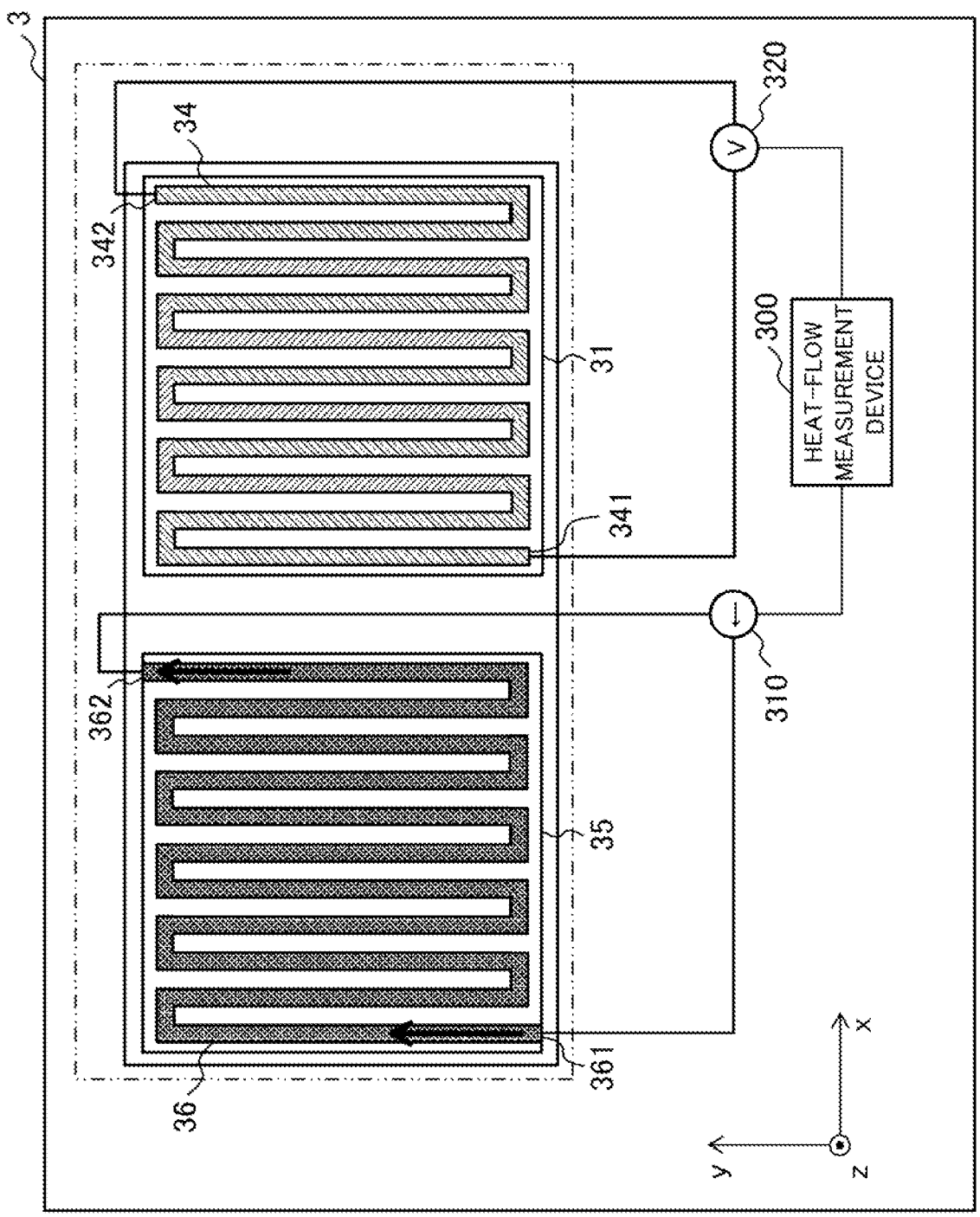
FIG. 18 is a conceptual diagram illustrating a state in which a direct current flows through a magnetic field application layer of the heat-flow sensor included in the heat-flow measurement system according to the third example embodiment.

FIG. 18 is a conceptual diagram illustrating a state in which the current flows through the magnetic field application layer 36 by arrows. FIG. 18 illustrates an example in which the heat-flow measurement device 300 drives the direct-current power supply 310 to cause the current to flow from the first end 361 to the second end 362 of the magnetic field application layer 36.

Figure 19:
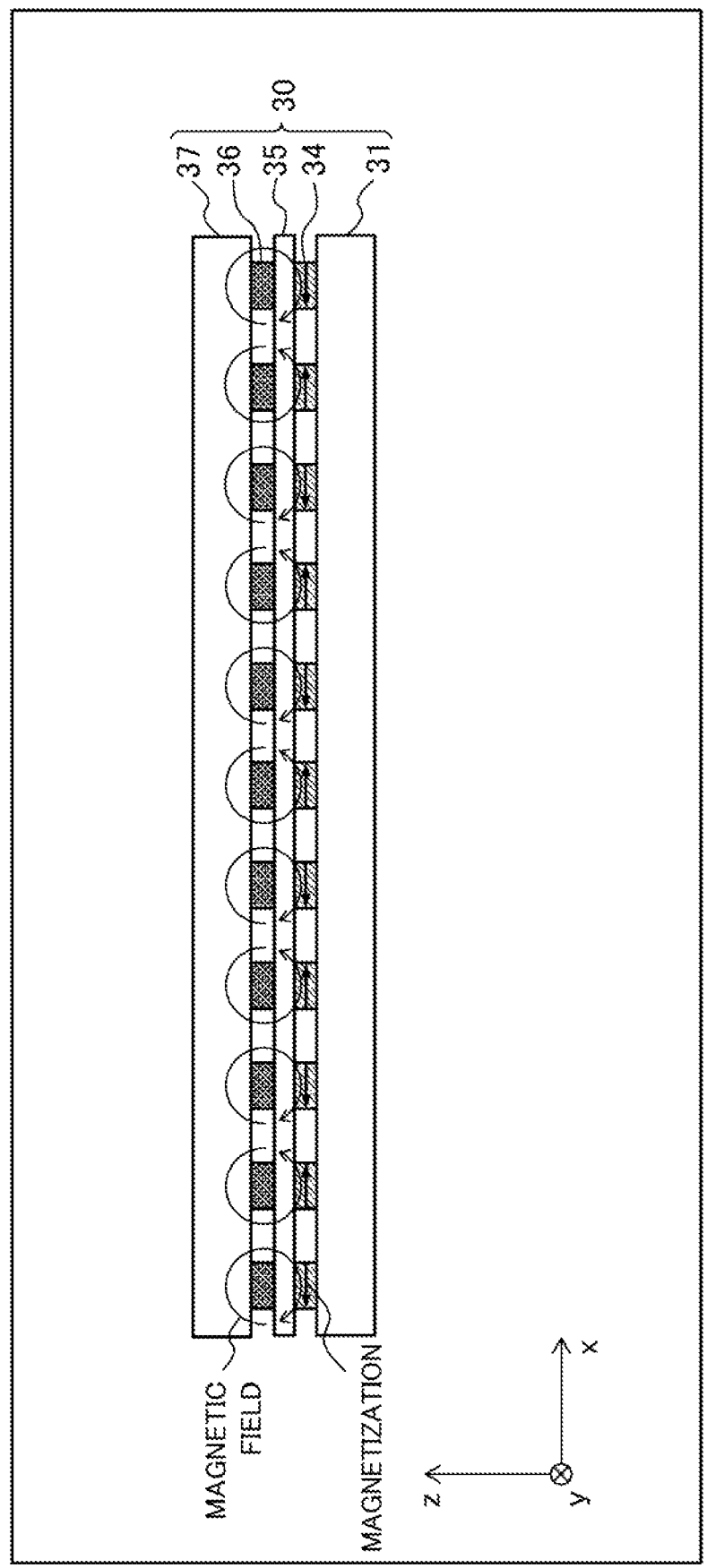
FIG. 19 is a conceptual diagram illustrating a state in which a heat-flow detection layer is magnetized when a direct current flows through the magnetic field application layer of the heat-flow sensor included in the heat-flow measurement system according to the third example embodiment.

FIG. 19 is a conceptual diagram illustrating a state in which a magnetic field generated in the magnetic field application layer 36 generates a magnetic field at the position of the heat-flow detection layer 34 when the current flows in the magnetic field application layer 36 as illustrated in FIG. 18. As illustrated in FIG. 19, when the current flows through the magnetic field application layer 36, the magnetic field is generated around a wire constituting the magnetic field application layer 36 according to the Ampere's law. The magnetic field around the wire constituting the magnetic field application layer 36 magnetizes the heat-flow detection layer 34. As illustrated in FIG. 19, among the wires constituting the heat-flow detection layer 34, adjacent wires are magnetized in the directions opposite to each other.

Figure 20:
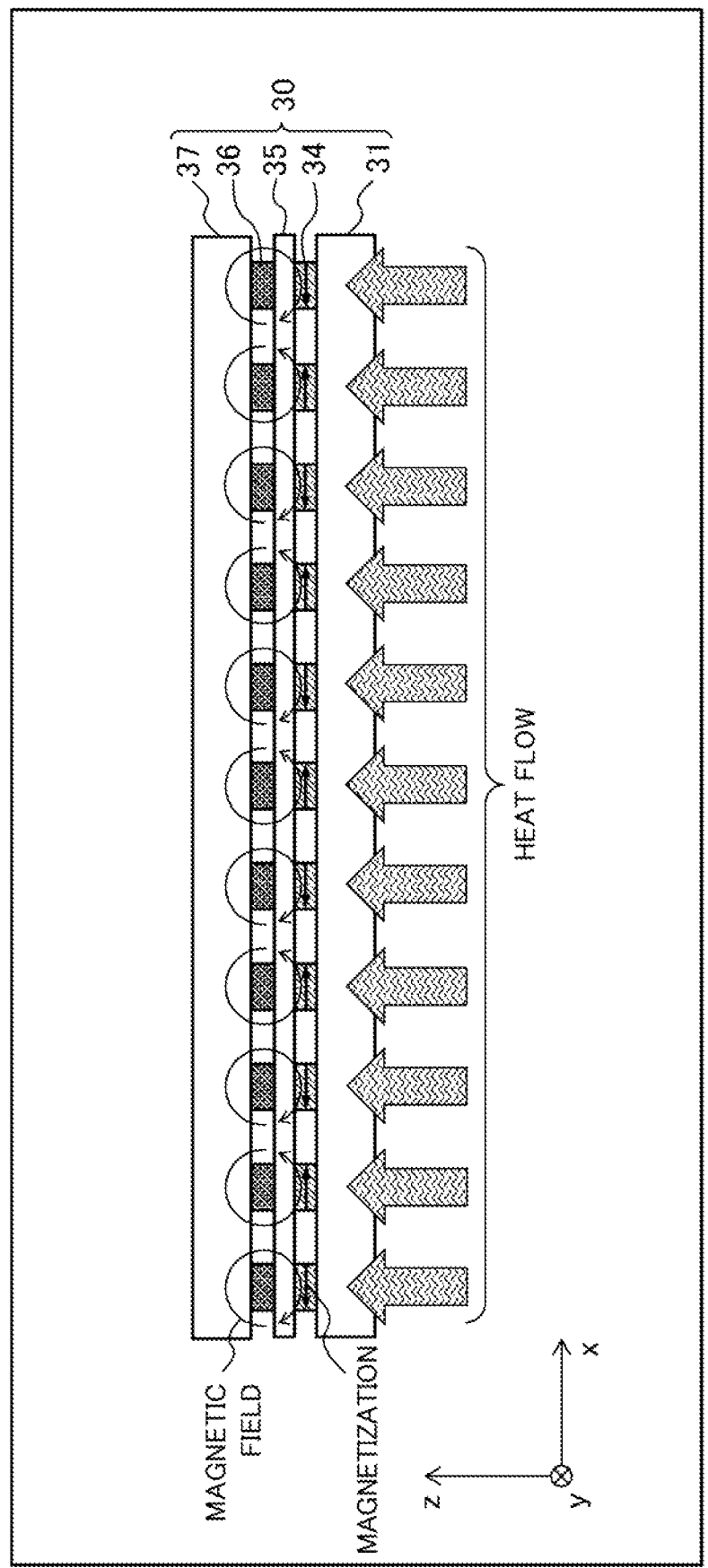
FIG. 20 is a conceptual diagram illustrating a state in which heat flow flows from an outside in a perpendicular direction to the heat-flow sensor included in the heat-flow measurement system according to the third example embodiment.
Figure 21:
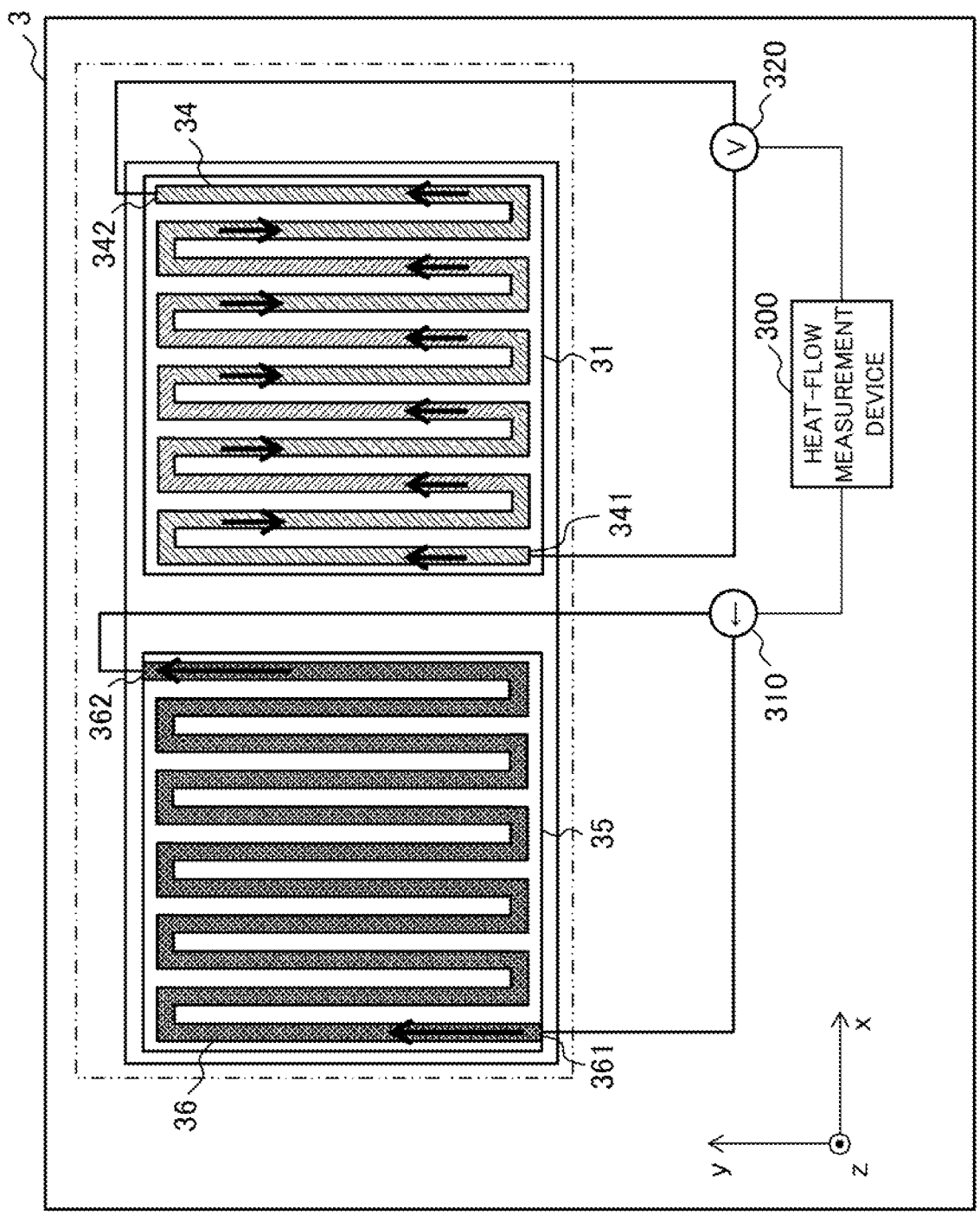
FIG. 21 is a conceptual diagram illustrating a state in which current flows in the heat-flow detection layer when heat flow flows from the outside in the perpendicular direction to the heat-flow sensor included in the heat-flow measurement system according to the third example embodiment.

FIG. 20 is a conceptual diagram illustrating a situation in which the heat flow has arrived from the outside in the state where the current flows in the magnetic field application layer 36 as illustrated in FIGS. 18 and 19. FIG. 21 is a conceptual diagram illustrating a state in which the electromotive force is generated in the heat-flow detection layer 34 and the current flows in the heat-flow detection layer 34 in the situation in which the heat flow has arrived from the outside in the state where the current flows through the magnetic field application layer 36.

When the heat flow passes through the heat-flow detection layer 34 from the substrate 31 toward the second magnetic field application layer 36 as illustrated in FIG. 20, the electromotive force due to the anomalous Nernst effect is generated in each conductive magnetic body constituting the heat-flow detection layer 34. As a result of the electromotive force generated at this time being added in the heat-flow detection layer 34 having the meander shape structure, an output voltage can be detected between the first end 341 and the second end 342 of the heat-flow detection layer 34. Since the output voltage between the first end 341 and the second end 342 of the heat-flow detection layer 34 is proportional to the heat-flow value, the heat flow passing through the heat-flow detection layer 34 can be measured by converting the detected output voltage into the heat-flow value.

In addition, the heat-flow measurement system 3 can be applied to a lock-in detection method in which a magnetic field is modulated at a frequency higher than that of a noise source and a signal is evaluated in a frequency region with less noise in order to prevent a weak signal from being buried in low-frequency noise and exogenous signal fluctuation such as vibration.

The configuration of the heat-flow measurement system 3 of the present example embodiment has been described above. The configuration of FIGS. 16 to 21 is an example of the configuration of the heat-flow measurement system 3, and the configuration of the heat-flow measurement system 3 of the present example embodiment is not limited to the configuration of FIGS. 16 to 21. Note that the heat-flow measurement system 3 of the present example embodiment may be configured to cause an alternating current to flow in the magnetic field application layer 36 as in the second example embodiment.

As described above, the heat-flow measurement system of the present example embodiment includes the heat-flow sensor including the insulating layer, the magnetic field application layer, and the heat-flow detection layer. The magnetic field application layer is arranged on the first surface of the insulating layer and is made of a conductor. The heat-flow detection layer is arranged on the second surface facing the first surface of the insulating layer, and is made of a conductive magnetic body. Regarding the magnetic field application layer and the heat-flow detection layer, the heat-flow detection layer faces the magnetic field application layer via the insulating layer.

In one aspect of the present example embodiment, the pattern of the conductor constituting the magnetic field application layer and the pattern of the conductive magnetic body constituting the heat-flow detection layer face each other. In one aspect of the present example embodiment, the magnetic field application layer and the heat-flow detection layer are provided via the insulating layer, and the wire pattern of the heat-flow detection layer is provided facing the wire pattern of the magnetic field application layer. In one aspect of the present example embodiment, the pattern of the conductor constituting the magnetic field application layer and the pattern of the conductive magnetic body constituting the heat-flow detection layer have the same shape. Further, in one aspect of the present example embodiment, the line of the pattern of the conductive magnetic body constituting the heat-flow detection layer is arranged to extend along the line length of the pattern of the conductor constituting the magnetic field application layer in top view.

According to the present example embodiment, it is possible to provide a highly sensitive thin-film heat-flow sensor that detects the heat flow with a single conductive magnetic body.

The heat-flow measurement system of each of the above example embodiments can be used for detecting abnormal heat generation of a product including a heating element such as a lithium ion battery. In general temperature detection, an abnormality is detected when the temperature of the heating element exceeds a threshold value. In contrast, since the heat-flow measurement system of each example embodiment detects the heat flow from the heating element, it is possible to detect the abnormality at the time when the heat flow exceeding the threshold value before the temperature of the heating element exceeds the threshold value.

In addition, since the heat-flow sensor of each example embodiment can be thinned, even when the heat-flow sensor is attached to a surface of an object to be measured, the heat-flow sensor is unlikely to hinder the flow of the heat flow in the perpendicular direction. Therefore, when the heat-flow sensor of each example embodiment is attached to a pipe of a plant, exhaust heat from the pipe can be managed in real time. In addition, by taking a log of the heat flow detected by the heat-flow sensor of each example embodiment, the exhaust heat from the pipe can be managed by the log.

Configuration Example

Figure 22:
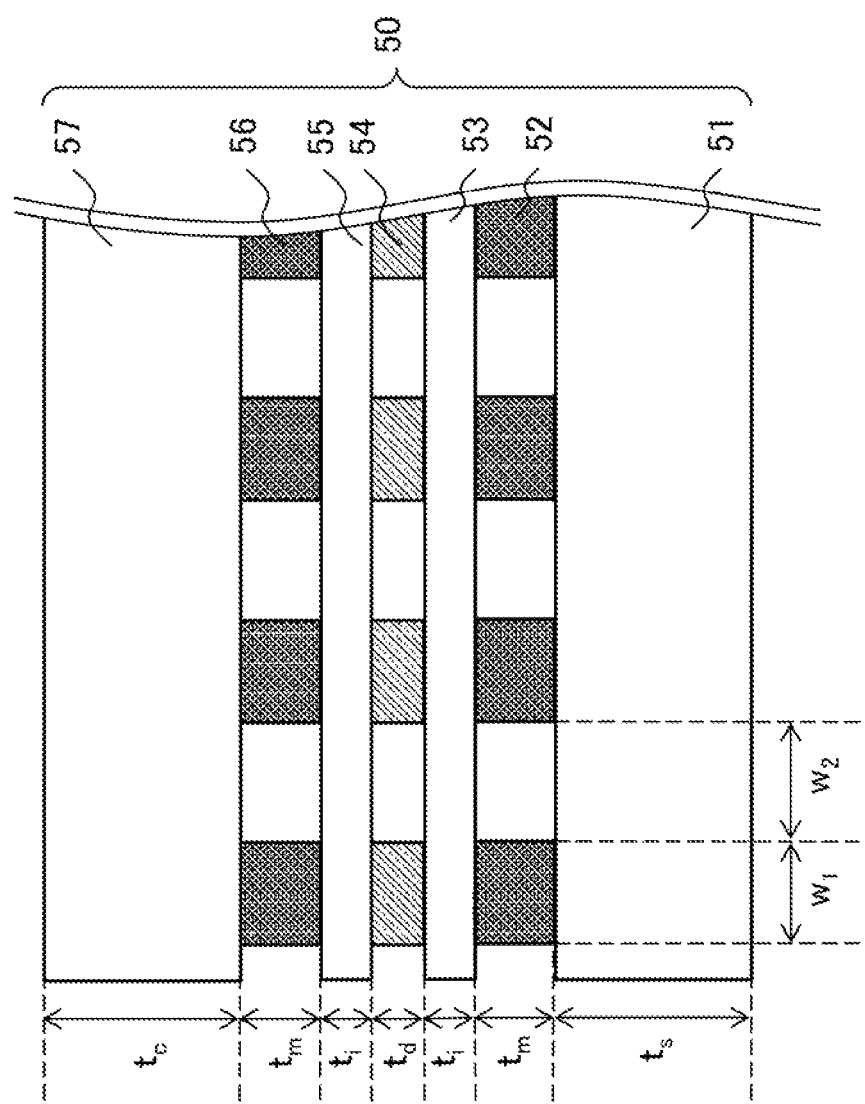
FIG. 22 is a conceptual diagram illustrating an example of a structure of a heat-flow sensor according to a configuration example.

Here, a configuration example of the heat-flow sensor according to each example embodiment will be described with an example. FIG. 22 is a conceptual diagram for describing an example of a structure of a heat-flow sensor 50 of the present configuration example. FIG. 22 is a side view of the flat-plate-like heat-flow sensor 50 as viewed from a side. The heat-flow sensor 50 of the present configuration example corresponds to the heat-flow sensor 10 of the first example embodiment. FIG. 22 illustrates a positional relationship among layers constituting the heat-flow sensor 50, and does not accurately illustrate the film thickness of each layer.

The heat-flow sensor 50 includes a substrate 51, a first magnetic field application layer 52, a first insulating layer 53, a heat-flow detection layer 54, a second insulating layer 55, a second magnetic field application layer 56, and a cover layer 57. Since the substrate 51, the first magnetic field application layer 52, the first insulating layer 53, the heat-flow detection layer 54, the second insulating layer 55, the second magnetic field application layer 56, and the cover layer 57 are similar to the corresponding components of the heat-flow sensor 10 of the first example embodiment, detailed description is omitted.

The shape of the heat-flow sensor 50 is a square having a side of 30 mm in top view. The patterns of conductors of the first magnetic field application layer 52 and the second magnetic field application layer 56 are the same as the pattern of a conductive magnetic body of the heat-flow detection layer 54. In the patterns of the conductors of the first magnetic field application layer 52 and the second magnetic field application layer 56 and the pattern of the conductive magnetic body of the heat-flow detection layer 54, 149 wires are parallel, and ends of adjacent wires are connected to form one wire, and form a meander shape. A width $w_1$ of the wires constituting the conductor patterns of the first magnetic field application layer 52 and the second magnetic field application layer 56 and the conductive magnetic body pattern of the heat-flow detection layer 54 is 100 micrometers, and an interval $w_2$ between the wires is 100 micrometers.

The substrate 51 and the cover layer 57 are made of polyimide. The material of the first magnetic field application layer 52 and the second magnetic field application layer 56 is copper (Cu). The heat-flow detection layer 54 is made of $Fe_3Al$. The material of the heat-flow detection layer 54 may be Ni. The first insulating layer 53 and second insulating layer 55 are made of polyimide.

A film thickness is of the substrate 51 and the cover layer 57 is 10 micrometers. A film thickness $t_m$ of the first magnetic field application layer 52 and the second magnetic field application layer 56 is 10 micrometers. A film thickness to of the heat-flow detection layer 54 is 1 micrometer. A film thicknesses $t_i$ of the first insulating layer 53 and the second insulating layer 55 is 5 micrometers.

To effectively magnetize the heat-flow detection layer 54, it is desirable to satisfy conditions of $t_m \geq t_i$ and $t_m \geq t_d$. Furthermore, to effectively magnetize the heat-flow detection layer 54, it is more desirable to satisfy the condition of $t_m \geq t_i + t_d$. The first reason is that the thicker the first magnetic field application layer 52 and the second magnetic field application layer 56 are, the smaller the electric resistance is, and the generation of the heat flow due to Joule heat is reduced. The second reason is that as the first magnetic field application layer 52 and the second magnetic field application layer 56 are thicker than the heat-flow detection layer 54, the variation in the magnetic field applied to the heat-flow detection layer 54 is reduced.

An example of the structure of the heat-flow sensor 50 of the present configuration example has been described above. Note that the configuration of the heat-flow sensor 50 of FIG. 22 is an example, and the configuration of the heat-flow sensor of each example embodiment is not limited to the form of FIG. 22.

The heat-flow sensor according to each example embodiment has been described above. Note that the heat-flow sensor of each example embodiment is an example, and the heat-flow sensor of each example embodiment is not limited to the form illustrated in the drawings.

(Hardware)

Here, a hardware configuration for implementing the heat-flow measurement device according to each example embodiment will be described taking an information processing apparatus 90 in FIG. 23 as an example. Note that the information processing apparatus 90 in FIG. 23 is a configuration example for executing processing of the heat-flow measurement device of each example embodiment, and does not limit the scope of the present invention.

Figure 23:
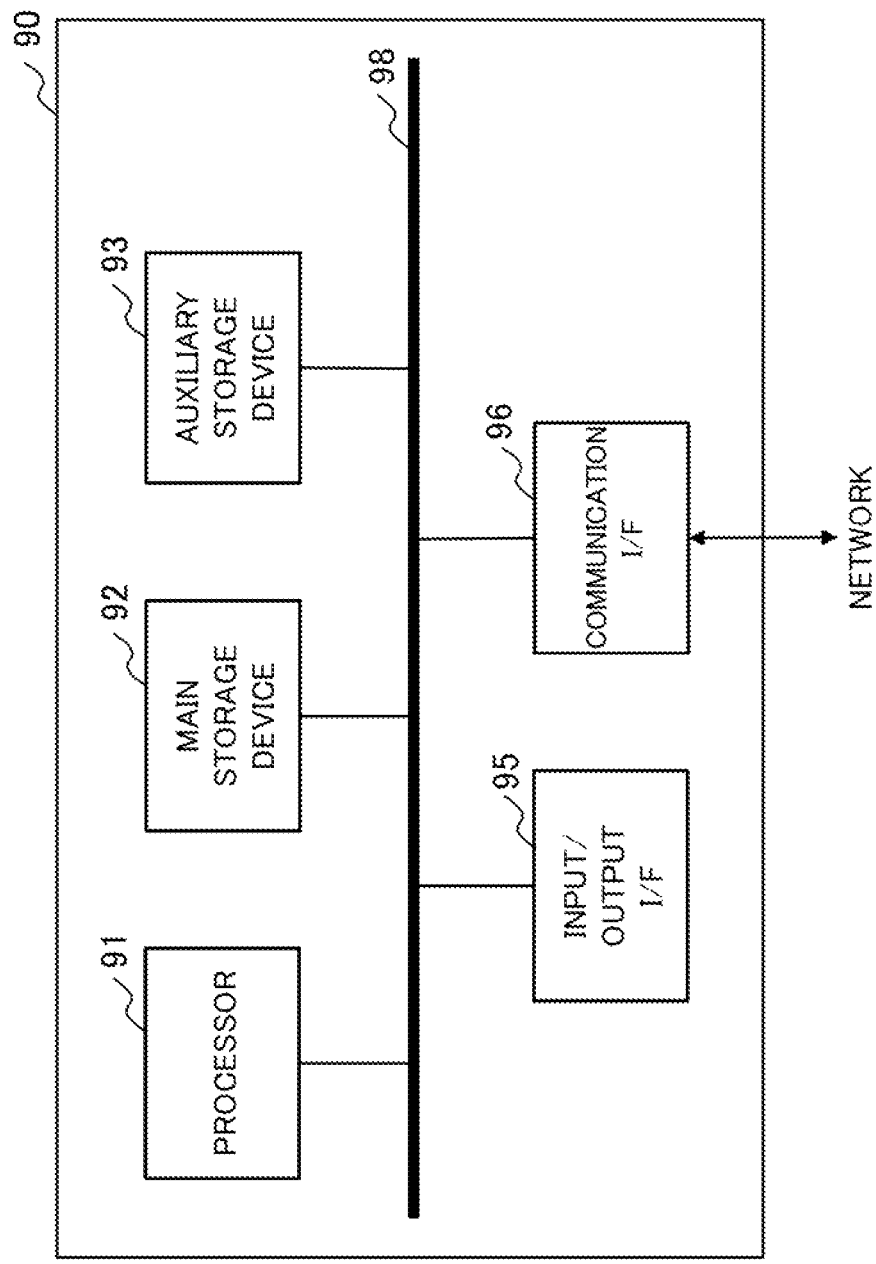
FIG. 23 is a block diagram for describing an example of a hardware configuration for implementing a control system according to each example embodiment.

As illustrated in FIG. 23, the information processing apparatus 90 includes a processor 91, a main storage device 92, an auxiliary storage device 93, an input/output interface 95, and a communication interface 96. In FIG. 23, an interface is abbreviated as an interface (I/F). The processor 91, the main storage device 92, the auxiliary storage device 93, the input/output interface 95, and the communication interface 96 are data-communicably connected to one another via a bus 98. In addition, the processor 91, the main storage device 92, the auxiliary storage device 93, and the input/output interface 95 are connected to a network such as the Internet or an intranet via the communication interface 96.

The processor 91 expands a program stored in the auxiliary storage device 93 or the like to the main storage device 92 and executes the expanded program. In the present example embodiment, a software program installed in the information processing apparatus 90 may be used. The processor 91 executes processing by the heat-flow measurement device according to the present example embodiment.

Corresponding to the heat-flow measurement device 100 (FIG. 7) of the first example embodiment, the functions of the power supply control unit 101, the voltage measurement unit 102, and the heat-flow calculation unit 103 are implemented by an operation of the processor 91. In addition, corresponding to the heat-flow measurement device 200 (FIG. 11) of the second example embodiment, the functions of the power supply control unit 201, the voltage measurement unit 202, the heat-flow calculation unit 203, and the correction unit 205 are implemented by the operation of the processor 91.

The main storage device 92 has an area in which a program is expanded. The main storage device 92 may be a volatile memory such as a dynamic random access memory (DRAM). In addition, a nonvolatile memory such as a magnetoresistive random access memory (MRAM) may be configured and added as the main storage device 92.

The auxiliary storage device 93 stores various data. The auxiliary storage device 93 includes a local disk such as a hard disk or a flash memory. Note that various data may be stored in the main storage device 92, and the auxiliary storage device 93 may be omitted.

The input/output interface 95 is an interface for connecting the information processing apparatus 90 and a peripheral device. The communication interface 96 is an interface for being connected to an external system or device through a network such as the Internet or an intranet on the basis of a standard or a specification. The input/output interface 95 and the communication interface 96 may be shared as an interface connected to an external device.

An input device such as a keyboard, a mouse, or a touch panel may be connected to the information processing apparatus 90 as necessary. These input devices are used to input information and settings. When the touch panel is used as the input device, a display screen of the display device may also serve as the interface of the input device. Data communication between the processor 91 and the input device may be mediated by the input/output interface 95.

Corresponding to the heat-flow measurement device 100 (FIG. 7) of the first example embodiment, the function of the output unit 107 is implemented by the operation of the input/output interface 95. In addition, corresponding to the heat-flow measurement device 200 (FIG. 11) of the second example embodiment, the function of the output unit 207 is implemented by the operation of the input/output interface 95.

Furthermore, the information processing apparatus 90 may be provided with a display device for displaying information. In a case where the display device is provided, the information processing apparatus 90 favorably includes a display control device (not illustrated) for controlling display of the display device. The display device may be connected to the information processing apparatus 90 via the input/output interface 95.

Furthermore, the information processing apparatus 90 may be provided with a drive device (not illustrated) that mediates reading and writing of data recorded on a recording medium (not illustrated). The drive device is connected to the bus 98, and mediates reading of data and a program from a recording medium, writing of a processing result of the information processing apparatus 90 to the recording medium, and the like between the processor 91 and the recording medium.

The recording medium can be implemented by, for example, an optical recording medium such as a compact disc (CD) or a digital versatile disc (DVD). Furthermore, the recording medium may be implemented by a semiconductor recording medium such as a universal serial bus (USB) memory or a secure digital (SD) card, a magnetic recording medium such as a flexible disk, or another recording medium. In the case where the program executed by the processor is recorded in the recording medium, the recording medium corresponds to a program recording medium.

The above is an example of the hardware configuration for enabling the heat-flow measurement device according to each example embodiment. The hardware configuration of FIG. 23 is an example of a hardware configuration for executing arithmetic processing of the heat-flow measurement device according to each example embodiment, and does not limit the scope of the present invention. In addition, a program for causing a computer to execute processing related to the heat-flow measurement device according to each example embodiment is also included in the scope of the present invention. Further, a program recording medium in which the program according to each example embodiment is recorded is also included in the scope of the present invention.

The components of the heat-flow measurement device of each example embodiment can be arbitrarily combined. In addition, the components of the heat-flow measurement device of each example embodiment may be implemented by software or may be implemented by a circuit.

While the present invention has been described with reference to the example embodiments, the present invention is not limited to these example embodiments. It will be understood by those of ordinary skill in the art that various changes in form and details of the present invention may be made therein without departing from the spirit and scope of the present invention as defined by the claims.

Some or all of the above example embodiments can be described as but are not limited to the following supplementary notes.

Supplementary Note 1

A heat-flow sensor including:
an insulating layer;
a magnetic field application layer arranged on a first surface of the insulating layer and including a conductor; and
a heat-flow detection layer arranged on a second surface of the insulating layer, the second surface facing the first surface, and the heat-flow detection layer including a conductive magnetic body, in which
the heat-flow detection layer faces the magnetic field application layer via the insulating layer.

Supplementary Note 2

The heat-flow sensor according to supplementary note 1, in which
a pattern of the conductor included in the magnetic field application layer and a pattern of the conductive magnetic body included in the heat-flow detection layer face each other.

Supplementary Note 3

The heat-flow sensor according to supplementary note 2, in which
the pattern of the conductor included in the magnetic field application layer and the pattern of the conductive magnetic body included in the heat-flow detection layer have a same shape.

Supplementary Note 4

The heat-flow sensor according to supplementary note 2 or 3, in which
a line of the pattern of the conductive magnetic body included in the heat-flow detection layer is arranged to extend along a line length of the pattern of the conductor included in the magnetic field application layer in top view.

Supplementary Note 5

A heat-flow sensor including:
a substrate;
a first magnetic field application layer arranged on an upper surface of the substrate and including a conductor;
a first insulating layer arranged on an upper surface of the first magnetic field application layer;
a heat-flow detection layer arranged on an upper surface of the first insulating layer and including a conductive magnetic body;
a second insulating layer arranged on an upper surface of the heat-flow detection layer; and
a second magnetic field application layer arranged on an upper surface of the second insulating layer and including a conductor, in which
the first magnetic field application layer, the second magnetic field application layer, and the heat-flow detection layer are configured in patterns of a same shape overlapping in top view.
The heat-flow sensor, in which
the heat-flow detection layer faces
the first magnetic field application layer via the first insulating layer, and
the second magnetic field application layer via the second insulating layer.

Supplementary Note 6

The heat-flow sensor according to supplementary note 5, in which
the patterns of the conductors included in the first magnetic field application layer and the second magnetic field application layer and the pattern of the conductive magnetic body included in the heat-flow detection layer face each other.

Supplementary Note 7

The heat-flow sensor according to supplementary note 6, in which the patterns of the conductors included in the first magnetic field application layer and the second magnetic field application layer and the pattern of the conductive magnetic body included in the heat-flow detection layer have a same shape.

Supplementary Note 8

The heat-flow sensor according to supplementary note 6 or 7, in which
a line of the pattern of the conductive magnetic body included in the heat-flow detection layer is arranged to extend along a line length of the pattern of the conductor included in each of the first magnetic field application layer and the second magnetic field application layer in top view.

Supplementary Note 9

The heat-flow sensor according to any one of supplementary notes 5 to 8, in which the heat-flow detection layer includes a soft conductive magnetic body.

Supplementary Note 10

The heat-flow sensor according to any one of supplementary notes 5 to 9, in which a distance between the first magnetic field application layer and the heat-flow detection layer and a distance between the second magnetic field application layer and the heat-flow detection layer are equal.

Supplementary Note 11

The heat-flow sensor according to any one of supplementary notes 5 to 10, in which the first magnetic field application layer, the second magnetic field application layer, and the heat-flow detection layer are configured in a meander pattern in which one wire is folded back.

Supplementary Note 12

The heat-flow sensor according to any one of supplementary notes 5 to 11, in which the first magnetic field application layer and the second magnetic field application layer are thicker in film thickness than the heat-flow detection layer.

Supplementary Note 13

A heat-flow measurement system including:
the heat-flow sensor according to any one of supplementary notes 5 to 12; and
a heat-flow measurement device configured to control current flowing through the first magnetic field application layer and the second magnetic field application layer, measure a voltage of the heat-flow detection layer, and convert a measured voltage value into a heat-flow value.

Supplementary Note 14

The heat-flow measurement system according to supplementary note 13, in which
each of the first magnetic field application layer, the second magnetic field application layer, and the heat-flow detection layer has a first end and a second end,
the first ends of the first magnetic field application layer and the second magnetic field application layer are electrically connected to each other,
the second ends of the first magnetic field application layer and the second magnetic field application layer are connected via a direct-current power supply, and
the heat-flow measurement device
performs control to cause a direct current to flow from the second end of either the first magnetic field application layer or the second magnetic field application layer, and measures a voltage between the first to end and the second end of the heat-flow detection layer.

Supplementary Note 15

The heat-flow measurement system according to supplementary note 13, in which
each of the first magnetic field application layer, the second magnetic field application layer, and the heat-flow detection layer has a first end and a second end,
the first ends of the first magnetic field application layer and the second magnetic field application layer are electrically connected to each other,
the second ends of the first magnetic field application layer and the second magnetic field application layer are connected via an alternating-current power supply, and
the heat-flow measurement device
performs control to cause an alternating current to flow from the second end of each of the first magnetic field application layer and the second magnetic field application layer, and measures a voltage between the first end and the second end of the heat-flow detection layer.

Supplementary Note 16

The heat-flow measurement system according to supplementary note 15, in which
the heat-flow measurement device corrects the heat-flow value with an average value of a maximum value and a minimum value of the voltage between the first end and the second end of the heat-flow detection layer as a baseline.

REFERENCE SIGNS LIST 1, 2, 3 heat-flow measurement system
10, 20, 30 heat-flow sensor
11, 21, 31 substrate
12, 22 first magnetic field application layer
13, 23 first insulating layer
14, 24, 34 heat-flow detection layer
15, 25 second insulating layer
16, 26 second magnetic field application layer
17, 37 cover layer
35 insulating layer
36 magnetic field application layer
100, 200, 300 heat-flow measurement device
101, 201 power supply control unit
102, 202 voltage measurement unit
103, 203 heat-flow calculation unit
107, 207 output unit
110, 310 direct-current power supply
120, 220, 320 voltmeter
130, 230 output device
205 correction unit
210 alternating-current power supply

What is claimed is:

1. A heat-flow sensor comprising:
a substrate;
a first magnetic field application layer arranged on an upper surface of the substrate and composed of a conductor;
a first insulating layer arranged on an upper surface of the first magnetic field application layer;
a heat-flow detection layer arranged on an upper surface of the first insulating layer and composed of a conductive magnetic body;
a second insulating layer arranged on an upper surface of the heat-flow detection layer; and
a second magnetic field application layer arranged on an upper surface of the second insulating layer and composed of a conductor, wherein
the first magnetic field application layer, the second magnetic field application layer, and the heat-flow detection layer are configured in patterns of a same shape overlapping in top view, and
a distance between the first magnetic field application layer and the heat-flow detection layer and a distance between the second magnetic field application layer and the heat-flow detection layer are equal.

2. The heat-flow sensor according to claim 1, wherein the patterns of the conductors comprising the first magnetic field application layer and the second magnetic field application layer and the pattern of the conductive magnetic body comprising the heat-flow detection layer face each other.

3. The heat-flow sensor according to claim 2, wherein the patterns of the conductors comprising the first magnetic field application layer and the second magnetic field application layer and the pattern of the conductive magnetic body comprising the heat-flow detection layer have a same shape.

4. The heat-flow sensor according to claim 2, wherein a line of the pattern of the conductive magnetic body comprising the heat-flow detection layer is arranged to extend along a line length of the pattern of the conductor included in each of the first magnetic field application layer and the second magnetic field application layer in top view.

5. The heat-flow sensor according to claim 1, wherein the heat-flow detection layer is composed of a magnetically permeable conductive material.

6. A heat-flow sensor comprising:
a substrate;
a first magnetic field application layer arranged on an upper surface of the substrate and composed of a conductor;
a first insulating layer arranged on an upper surface of the first magnetic field application layer;
a heat-flow detection layer arranged on an upper surface of the first insulating layer and composed of a conductive magnetic body;
a second insulating layer arranged on an upper surface of the heat-flow detection layer; and
a second magnetic field application layer arranged on an upper surface of the second insulating layer and composed of a conductor, wherein
the first magnetic field application layer, the second magnetic field application layer, and the heat-flow detection layer are configured in a meander pattern in which one wire is folded back, and
the first magnetic field application layer, the second magnetic field application layer, and the heat-flow detection layer are configured in patterns of a same shape overlapping in top view.

7. The heat-flow sensor according to claim 1, wherein the first magnetic field application layer and the second magnetic field application layer are thicker in film thickness than the heat-flow detection layer.

8. A heat-flow measurement system comprising:
the heat-flow sensor according to claim 1; and
a heat-flow measurement device configured to control a current flowing through the first magnetic field application layer and the second magnetic field application layer, measure a voltage of the heat-flow detection layer, and convert a measured voltage value into a heat-flow value.

9. A heat-flow measurement system comprising:
a heat-flow sensor including
a substrate,
a first magnetic field application layer arranged on an upper surface of the substrate and composed of a conductor,
a first insulating layer arranged on an upper surface of the first magnetic field application layer,
a heat-flow detection layer arranged on an upper surface of the first insulating layer and composed of a conductive magnetic body,
a second insulating layer arranged on an upper surface of the heat-flow detection layer, and
a second magnetic field application layer arranged on an upper surface of the second insulating layer and composed of a conductor, and
a heat-flow measurement device configured to control a current flowing through the first magnetic field application layer and the second magnetic field application layer, measure a voltage of the heat-flow detection layer, and convert a measured voltage value into a heat-flow value, wherein
the first magnetic field application layer, the second magnetic field application layer, and the heat-flow detection layer are configured in patterns of a same shape overlapping in top view,
each of the first magnetic field application layer, the second magnetic field application layer, and the heat-flow detection layer has a first end and a second end,
the first ends of the first magnetic field application layer and the second magnetic field application layer are electrically connected to each other,
the second ends of the first magnetic field application layer and the second magnetic field application layer are connected via a direct-current power supply, and
the heat-flow measurement device is configured to
perform control to cause a direct current to flow from the second end of either the first magnetic field application layer or the second magnetic field application layer, and measure a voltage between the first end and the second end of the heat-flow detection layer.

10. The heat-flow measurement system according to claim 8, wherein
each of the first magnetic field application layer, the second magnetic field application layer, and the heat-flow detection layer has a first end and a second end,
the first ends of the first magnetic field application layer and the second magnetic field application layer are electrically connected to each other,
the second ends of the first magnetic field application layer and the second magnetic field application layer are connected via an alternating-current power supply, and the heat-flow measurement device is configured to
perform control to cause an alternating current to flow from the second end of each of the first magnetic field application layer and the second magnetic field application layer, and measure a voltage between the first end and the second end of the heat-flow detection layer.

11. The heat-flow measurement system according to claim 10, wherein
the heat-flow measurement device is configured to
correct the heat-flow value with an average value of a maximum value and a minimum value of the voltage between the first end and the second end of the heat-flow detection layer as a baseline.

* * * * *